United States Patent
Yasugi

(10) Patent No.: US 9,380,301 B2
(45) Date of Patent: Jun. 28, 2016

(54) IMAGE INTRA-PREDICTION MODE ESTIMATION DEVICE, IMAGE ENCODING DEVICE, IMAGE DECODING DEVICE, AND ENCODED IMAGE DATA THAT ADAPTIVELY DECIDES THE NUMBER OF ESTIMATED PREDICTION MODES TO BE ESTIMATED

(75) Inventor: Yukinobu Yasugi, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 535 days.

(21) Appl. No.: 13/810,081

(22) PCT Filed: Jul. 14, 2011

(86) PCT No.: PCT/JP2011/066055
§ 371 (c)(1),
(2), (4) Date: Jan. 14, 2013

(87) PCT Pub. No.: WO2012/008514
PCT Pub. Date: Jan. 19, 2012

(65) Prior Publication Data
US 2013/0121414 A1    May 16, 2013

(30) Foreign Application Priority Data
Jul. 15, 2010   (JP) .................................. 2010-160266

(51) Int. Cl.
*H04N 11/02* (2006.01)
*H04N 19/50* (2014.01)
(Continued)

(52) U.S. Cl.
CPC ......... *H04N 19/00569* (2013.01); *H04N 19/11* (2014.11); *H04N 19/147* (2014.11); *H04N 19/176* (2014.11); *H04N 19/196* (2014.11);

(Continued)

(58) Field of Classification Search
USPC ....................................... 375/240.01–240.29
See application file for complete search history.

(56) References Cited

U.S. PATENT DOCUMENTS

| 8,670,488 B2 * | 3/2014 | Andersson et al. ...... 375/240.29 |
| 2003/0223645 A1 | 12/2003 | Sun et al. |

(Continued)

FOREIGN PATENT DOCUMENTS

| JP | 2003-520531 A | 7/2003 |
| JP | 2005-528047 A | 9/2005 |

(Continued)

OTHER PUBLICATIONS

European Search Report for application No. 11806844.4 dated Oct. 2, 2014.

(Continued)

*Primary Examiner* — Leron Beck
(74) *Attorney, Agent, or Firm* — Birch, Stewart, Kolasch & Birch, LLP

(57) ABSTRACT

A coding device and a decoding device are configured to include an estimated prediction mode deciding section (122*a*) including: a reference block selecting section (1223*a*) for selecting a reference block for use in estimating an intra-prediction mode for a subject block; an estimating number deciding section (1222*a*) for deciding an estimating number of estimated values to be estimated for the intra-prediction mode; and an estimated prediction mode deriving section (1221*a*) for estimating, based on a reference block, the estimating number of estimated values of the prediction mode.

2 Claims, 22 Drawing Sheets

(51) Int. Cl.
  H04N 19/176 (2014.01)
  H04N 19/147 (2014.01)
  H04N 19/196 (2014.01)
  H04N 19/593 (2014.01)
  H04N 19/11 (2014.01)
  H04N 19/463 (2014.01)

(52) U.S. Cl.
  CPC .......... *H04N 19/463* (2014.11); *H04N 19/593* (2014.11)

(56) References Cited

U.S. PATENT DOCUMENTS

| | | | |
|---|---|---|---|
| 2008/0247657 A1 | 10/2008 | Kalevo et al. | |
| 2009/0110070 A1* | 4/2009 | Takahashi et al. | 375/240.12 |
| 2010/0118943 A1 | 5/2010 | Shiodera et al. | |

FOREIGN PATENT DOCUMENTS

| | | |
|---|---|---|
| JP | 2009-89267 A | 4/2009 |
| JP | 2010-56701 A | 3/2010 |
| WO | WO 2008/084817 A1 | 7/2008 |
| WO | WO 2008/157269-A2 | 12/2008 |

OTHER PUBLICATIONS

Yi Guo et al. "Priority-based Template Matching Intra Prediction", Multimedia and Expo, 2008 IEEE International Conference on, IEEE, Piscataway, NJ, USA, Jun. 23, 2008, pp. 1117-1120, XP031312922.

International Search Report for PCT/JP2011/066055 dated Oct. 18, 2011.

McCann et al., "Samsung's Response to the Call for Proposals on Video Compression Technology (JCTVC-A124)", 1st Meeting: Apr. 15-23, 2010, 42 pages.

Recommendation ITU-T H.264, Telecommunication Standardization Sector of ITU, Mar. 2009.

Toru Kumakura, et al., "Fixing the number of mpm candidates", Joint Collaborative Team on Video Coding (JCT-VC) of ITU-T SG16 WP3 and ISO/IEC JTC1/SC29/WG11 6th Meeting: Torino, IT, Jul. 1, 2011, [JCTVC-F340] (version 1).

Vadim Seregin, et al., "Intra mode parsing without access neighbouring information", Joint Collaborative Team on Video Coding (JCT-VC) of ITU-T SG16 WP3 and ISO/IEC JTC1/SC29M/WG11 6th Meeting: Torino, IT, Jul. 6, 2011, [JCTVC-F378] (version 3).

Wei-Jung Chien et al., "Parsing friendly intra mode coding", Joint Collaborative Team on Video Coding (JCT-VC) of ITU-T SG16 WP3 and ISO/IEC JTC1/SC29/WG11 6th Meeting: Torino, IT, Jul. 2, 2011, [JCTVC-F459] (version 1).

* cited by examiner

FIG. 5

|  | MODE 0 | MODE 1 | MODE 2 | MODE 3 | MODE 4 | MODE 5 | MODE 6 | MODE 7 | MODE 8 |
|---|---|---|---|---|---|---|---|---|---|
| LEFTWARD ADJACENT BLOCK | 0.75 | 1.0 | 0.75 | 0.5 | 0.25 | 0.0 | 0.25 | 0.5 | 0.1 |
| UPWARD ADJACENT BLOCK | 0.25 | 0.0 | 0.25 | 0.5 | 0.75 | 1.0 | 0.75 | 0.5 | 0.1 |
| UPPER-LEFTWARD ADJACENT BLOCK | 0.0 | 0.0 | 0.5 | 1.0 | 0.5 | 0.0 | 0.0 | 0.0 | 0.1 |

FIG. 7

| | Conditions | flag_bit0 | flag_bit1 | rem_bits |
|---|---|---|---|---|
| (a) | $m = p1$ | 1 | none | none |
| (b) | $m \neq p1$ and $m = p2$ | 0 | 1 | none |
| (c1) | $m \neq p1$ and $m \neq p2$ and $m < p_{min}$ | 0 | 0 | $k=binary(m, B_{M'})$ |
| (c2) | $m \neq p1$ and $m \neq p2$ and $p_{min} < m$ and $m < p_{max}$ | 0 | 0 | $k=binary(m-1, B_{M'})$ |
| (c3) | $m \neq p1$ and $m \neq p2$ and $p_{max} < m$ | 0 | 0 | $k=binary(m-2, B_{M'})$ |

FIG. 10

| flag_bit0 | flag_bit1 | rem_bits | m |
|---|---|---|---|
| 1 | none | none | p1 |
| 0 | 1 | none | p2 |
| 0 | 0 | k | (m' = decimal(k,B_{M'});<br>m = (m' < p_{min}) ? m' : ( (m' < p_{max}) ? m'+1 : m'+2 ) ) |

FIG. 19

|  | Conditions | flag_bit | rem_bits |
|---|---|---|---|
| (a) | $m = p$ | 1 | none |
| (b1) | $m \neq p$ and $m < p$ | 0 | $k = binary(m, B_{M'})$ |
| (b2) | $m \neq p$ and $m > p$ | 0 | $k = binary(m-1, B_{M'})$ |

FIG. 22

| flag_bit | rem_bits | m | p | |
|---|---|---|---|---|
| 1 | - | | | |
| 0 | k | $m'=\text{decimal}(k, B_{M'})$, | | $m = (m'<p) ? m' : m'+1$ |

IMAGE INTRA-PREDICTION MODE ESTIMATION DEVICE, IMAGE ENCODING DEVICE, IMAGE DECODING DEVICE, AND ENCODED IMAGE DATA THAT ADAPTIVELY DECIDES THE NUMBER OF ESTIMATED PREDICTION MODES TO BE ESTIMATED

TECHNICAL FIELD

The present invention relates to an image coding device for coding an image and an image decoding device for decoding a coded image.

BACKGROUND ART

In order to efficiently transmit or record a moving image, a moving image coding device for coding a moving image and a moving image decoding device for decoding a moving image are widely used. Typical examples of a moving image coding method encompass a method adopted in H.264/MPEG-4.AVC (Non-patent Literature 1) and a method adopted in KTA software which is a codec for joint development in VCEG (Video Coding Expert Group).

In these coding methods, each of pictures constituting a moving image is managed by a hierarchical structure that is constituted by (i) a slice which is obtained by dividing a picture, (ii) a macroblock which is obtained by dividing the slice, and (iii) a block which is obtained by dividing the macroblock.

The moving image coding device codes a moving image per block. Specifically, the moving image coding device performs (1) DCT (Discrete Cosine Transform) transformation of a prediction residual for each block, which prediction residual is obtained by subtracting a predicted image from an original image, (2) quantization of a DCT coefficient which is obtained from the DCT transformation, and (3) a variable length coding of the DCT coefficient thus quantized. In general, reduction of an amount of codes is possible by performing, not for an original image but for a prediction residual, the DCT transformation, quantization, and variable length coding.

The moving image coding device generates the above-mentioned predicted image on the basis of a locally decoded image which is obtained by performing inverse quantization and inverse DCT transformation of the DCT coefficient that has been quantized. As methods for generating the predicted image, there are inter-screen prediction (inter prediction) and intra-screen prediction (intra prediction). In the moving image coding device, a prediction method to be used is selected for each macroblock. Note that because the present invention relates to intra prediction, the following discusses a case where the intra prediction is selected and used, and explanations on a process regarding the inter prediction is omitted here.

Meanwhile, the moving image decoding device decodes a moving image per block. Specifically, the moving image decoding device obtains a decoded image, by performing (1) decoding of a DCT coefficient which has been subjected to variable length coding and quantization, (2) inverse quantization of the DCT coefficient that is obtained by the decoding, and (3) adds, to a predicted image, a prediction residual which is obtained by inverse DCT transformation per block. A method for generating the predicted image in the moving image decoding device is identical with that in the moving image coding device.

The moving image coding device and the moving image decoding device of the conventional art each use a value that is called an intra-prediction mode (hereinafter, simply referred to as prediction mode), for generating an intra-prediction image per block. The prediction mode for a subject block has a value associated with one estimated value that is estimated from an adjacent block neighboring the subject block (Non-patent Literature 1). The estimated value is called an estimated prediction mode. The moving image coding device codes the value of the prediction mode by use of the estimated prediction mode. Similarly, the moving image decoding device decodes, by use of the estimated prediction mode, the prediction mode from coded data which is generated by the moving image coding device. In a case where the estimated prediction mode is identical with an actual prediction mode, coding is performed in such a way that a code length is shorter than that in a case where the actual prediction mode is directly coded.

In recent years, to cope with a higher definition of a digital image today, coding by use of a larger macroblock has been attempted. Moreover, in order to perform more precise intra prediction for a large macroblock, it has been attempt to increase a total number of prediction modes by fractionalized prediction directions. (b) of FIG. 14 is a view illustrating 32 types of prediction directions as a specific example of multiple directional predictions. For example, in a technique disclosed in Non-patent Literature 2, it is possible to employ a prediction mode that involves (i) more processing units (blocks) as compared to Non-patent Literature 1 and (ii) multiple directional predictions in more directions which are similar to those shown in (b) of FIG. 14. In particular, for respective blocks dimensions of which are 16×16 and 32×32, a total number M of the prediction modes=33.

CITATION LIST

Non-Patent Literature

[Non-patent Literature 1]
"Recommendation ITU-T H.264," Telecommunication Standardization Sector of ITU, 03/2009 (Publication Date: March, 2009)
[Non-patent Literature 2]
Ken McCann et. al., "Samsung's Response to the Call for Proposals on Video Compression Technology (JCTVC-A124)," 1st Meeting: Dresden, Del., 15-23 Apr. 2010 (Publication Date: April, 2010)

SUMMARY OF INVENTION

Technical Problem

The inventor of the present invention found out that in a case where a block for which a total number of prediction modes is increased is processed with only one estimated prediction mode, a possibility that the estimated prediction mode is identical with an actual prediction mode tend to decrease and consequently an efficiency in coding the prediction mode tends to decrease.

In order to prevent the efficiency in coding from decreasing, increasing the number of the estimated prediction modes is conceivable to increase the possibility that the estimated prediction mode is identical with the actual prediction mode. However, increase in total number of the estimated prediction modes leads to increase in amount of codes required for coding the estimated prediction modes and the actual prediction mode. As such, the efficiency in coding may not be actually improved.

The present invention is accomplished in view of the above-mentioned problem. An object of the present invention is to provide an intra-prediction mode estimation device which can realize such image prediction mode estimation in a process of coding or decoding a digital image including a plurality of blocks that can (i) suppress an increase in coding required for coding an estimated prediction mode and a prediction mode and (ii) increase a possibility that the estimated prediction mode is identical with an actual prediction mode at the same time, thereby to increase an efficiency in coding of the digital image.

Solution to Problem

In order to solve the above problem, an intra-prediction mode estimation device of the present invention for performing intra-prediction mode estimation of an image, in a coding process or a decoding process for a digital image constituted of a plurality of blocks, includes: a selecting section for selecting one or more reference blocks for comparison with a subject block, which is a subject for the intra-prediction mode estimation; an estimating number deciding section for deciding a total number of estimated prediction modes to be estimated as estimated values in the intra-prediction mode estimation for the subject block; and an estimating section for performing the intra-prediction mode estimation for the total number of the estimated prediction modes with respect to the subject block, based on a prediction mode used for a coding process of the reference block thus selected.

In addition, in order to solve the above problem, a coding device of the present invention for coding a digital image constituted by a plurality of blocks, includes: a selecting section for selecting one or more reference blocks for a subject block, which is a subject for the coding; an estimating number deciding section for deciding a total number of estimated prediction modes to be estimated as estimated values in intra-prediction mode estimation for the subject block; an estimating section for performing the intra-prediction mode estimation for the total number of the estimated prediction modes with respect to the subject block, based on a prediction mode used for a coding process of the reference block thus selected; a prediction mode deciding section for deciding a prediction mode for the subject block; a prediction mode coding section for coding the estimated prediction modes and the prediction mode in such a way that a code length of the coding is different according to whether or not the prediction mode is identical with any one of the estimated prediction modes; and a prediction image generating section for generating a predicted image of the subject block, based on the prediction mode, the prediction mode coding section performing the coding in such a way that the code length of the coding is shorter when the prediction mode is identical with any one of the estimated prediction modes than when the prediction mode is not identical with any one of the estimated prediction modes.

Moreover, in order to solve the above problem, a decoding device of the present invention for decoding a coded data of a digital image constituted by a plurality of blocks, includes: a selecting section for selecting one or more reference blocks for a subject block, which is a subject for the decoding; an estimating number deciding section for deciding a total number of estimated prediction modes to be estimated as estimated values in intra-prediction mode estimation for the subject block; an estimating section for performing the intra-prediction mode estimation for the total number of the estimated prediction modes with respect to the subject block, based on a prediction mode used for a coding process of the reference block thus selected; a prediction mode decoding section for decoding, from the coded data, a prediction mode to be used in generation of predicted image of the subject block, the prediction mode decoding section performing the decoding based on the total number of the estimated prediction modes and the estimated prediction modes; and a prediction image generating section for generating a predicted image of the subject block, based on the prediction mode.

Furthermore, in order to solve the above problem, coded data of an image, which coded data, constituted by a plurality of blocks, is outputted or is to be outputted from a coding device of the present invention, the coded data includes: a) information indicating that a first estimated prediction mode for the block is identical with a prediction mode for the block; b) information indicating that a second estimated prediction mode but not the first estimated prediction mode is identical with the prediction mode; or c) (i) information indicating that the first estimated prediction mode and the second estimated prediction mode are not identical with the prediction mode, and (ii) information regarding the prediction mode.

According to the configuration described above, it is possible to adaptively decide, for each subject block, a total number of estimated prediction modes to be estimated. In general, use of a large number of estimated prediction modes can increase a possibility that the estimated prediction mode is identical with an actual prediction mode. However, in a case where none of the estimated prediction modes is identical with the actual prediction mode, an amount of codes is increased. According to the configuration described above, the total number of the estimated prediction modes to be estimated is adaptively decided. This makes it possible to efficiently code and decode a prediction mode by use of a smaller average amount of codes.

Advantageous Effects of Invention

As described above, the intra-prediction mode estimation device of the present invention for performing intra-prediction mode estimation of an image, in a coding process or a decoding process for a digital image constituted of a plurality of blocks, includes: a selecting section for selecting one or more reference blocks for comparison with a subject block, which is a subject for the intra-prediction mode estimation; an estimating number deciding section for deciding a total number of estimated prediction modes to be estimated as estimated values in the intra-prediction mode estimation for the subject block; and an estimating section for performing the intra-prediction mode estimation for the total number of the estimated prediction modes with respect to the subject block, based on a prediction mode used for a coding process of the reference block thus selected.

Accordingly, it is possible to efficiently code and decode a prediction mode by use of a smaller average amount of codes by adaptively deciding the total number of the estimated prediction modes to be estimated.

Further, as described above, in the moving image coding device of the present invention, even in a case where any of a large number of prediction modes can be selected, efficient coding of a prediction mode is possible by using a smaller average amount of codes by selectively using a plurality of estimated prediction modes. Moreover, the moving image decoding device of the present invention can decode coded data which has been coded by such a moving image coding device.

BRIEF DESCRIPTION OF DRAWINGS

FIG. 1 is a view illustrating a configuration of a prediction information coding section 12a.

FIG. 2 is a view illustrating a configuration of an MB coding section 10a.

FIG. 3 is a view illustrating components of an estimated prediction mode deciding section 122a.

FIG. 5 is a view illustrating a specific example of a predetermined table for deriving a degree of contribution.

FIG. 7 is a table showing a specific example of a coding method for transforming a prediction mode to coded data.

FIG. 8 is a view illustrating a configuration of an MB decoding section 20a.

FIG. 9 is a view illustrating a configuration of a prediction information decoding section 23a.

FIG. 10 is a view illustrating a specific example of a method for decoding coded data to a prediction mode.

FIG. 19 is a table illustrating a specific example of a coding method for transforming a prediction mode to coded data.

FIG. 22 is a table illustrating a specific example of a method for decoding coded data to a prediction mode.

DESCRIPTION OF EMBODIMENTS

The following description will discuss embodiments of the present invention, with reference to drawings. Note that components mentioned in preceding description are respectively given the identical reference signs to those assigned to components when the component is mentioned for the first time is assigned to the component, and a description will not be provided.

First, details of a coding process and a decoding process of the conventional intra prediction will be described below with reference to the figures.

Figure 11:
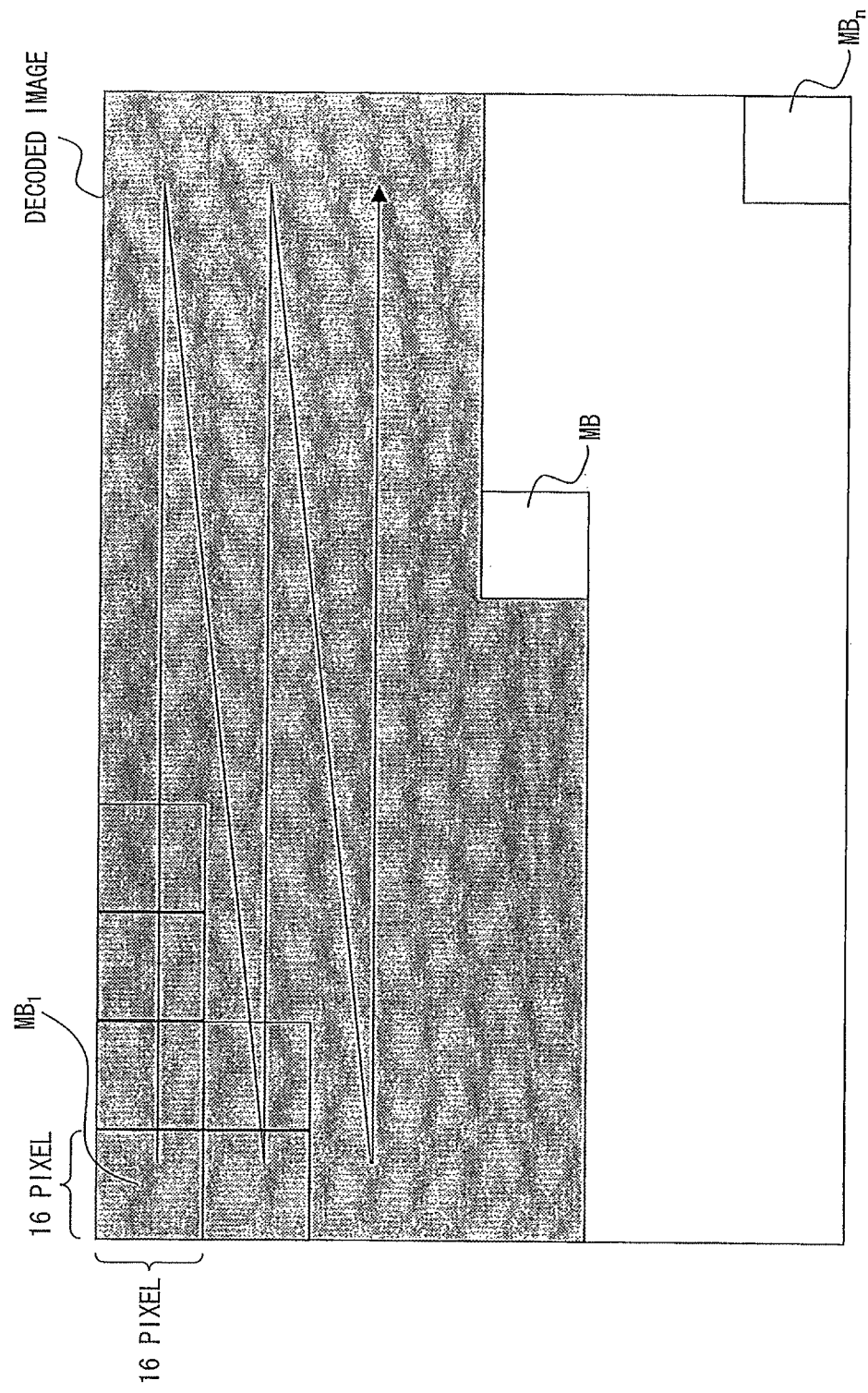
FIG. 11 is a view schematically illustrating a slice constituted by macroblocks MB1 to MBn.
Figure 12:
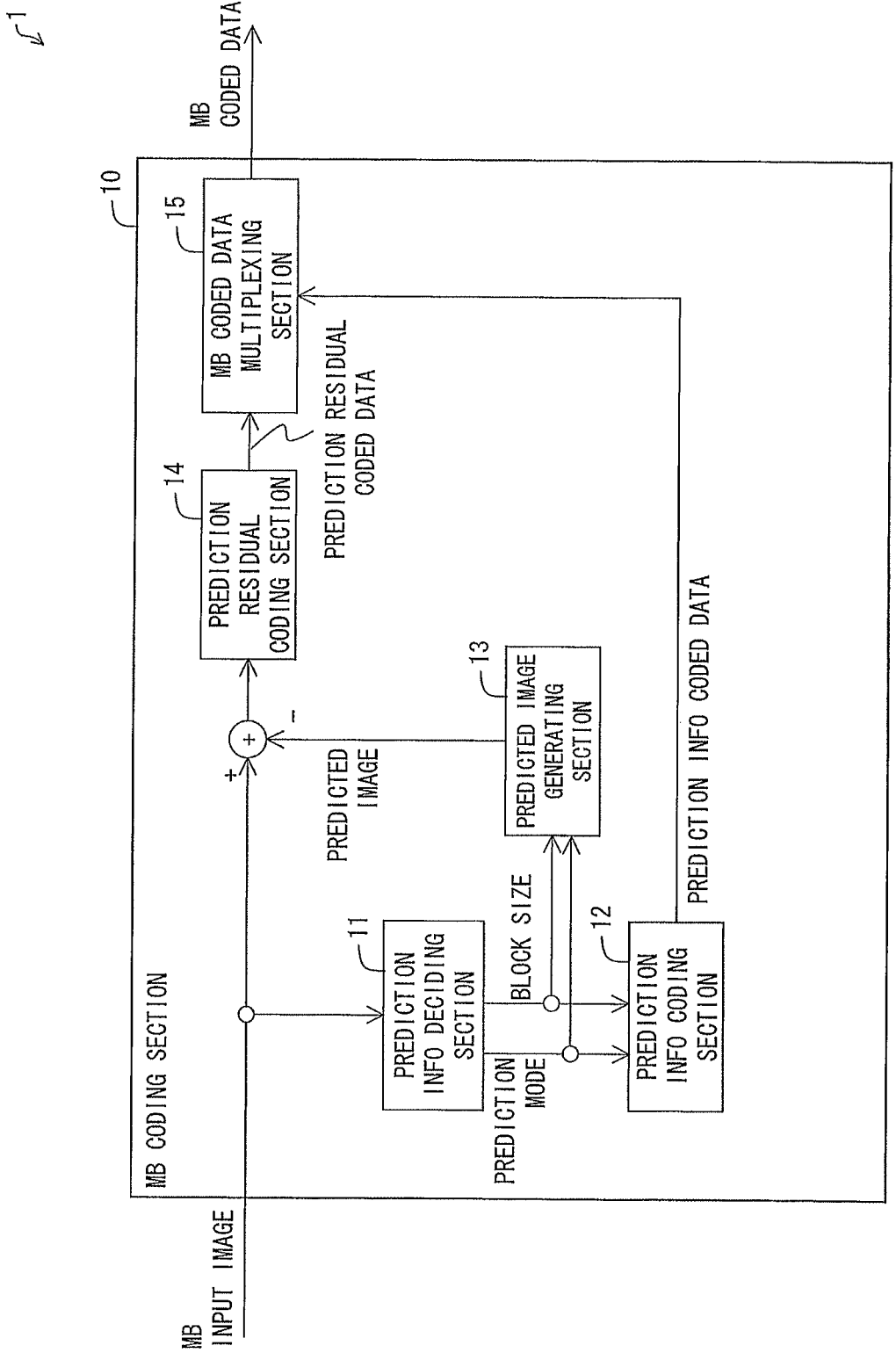
FIG. 12 is a view illustrating an MB coding section 10 in a conventional moving image coding device 1.
Figure 13:
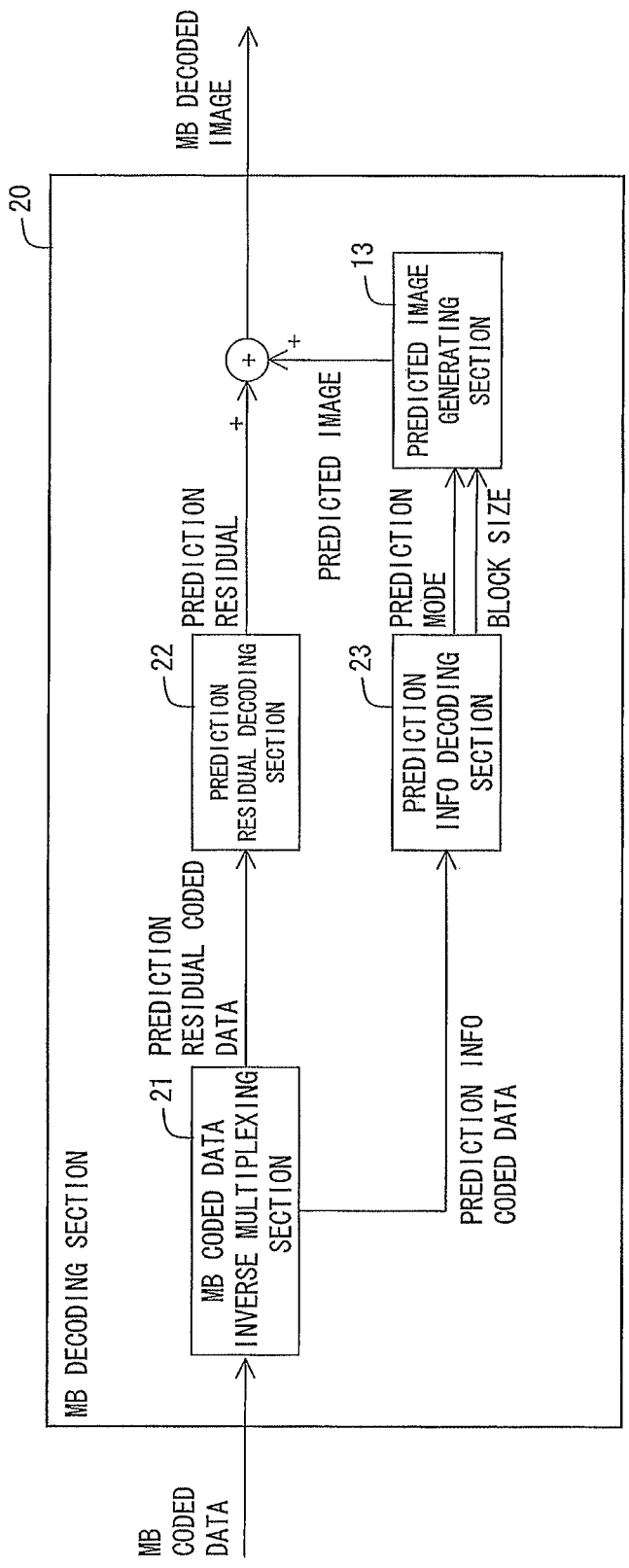
FIG. 13 is a view illustrating an MB decoding section 20 in a conventional moving image coding device 2.

FIG. 11 is a schematic view illustrating a slice constituted by macroblocks MB 1 to MB n. Further, FIG. 12 is a view illustrating an MB coding section 10 in a conventional moving image coding device 1, and FIG. 13 is a view illustrating an MB decoding section 20 in a conventional moving image coding device 2.

A coding process in the moving image coding device 1 and a decoding process in the moving image decoding device 2 are performed as described below in brief. First, the moving image coding device 1 performs the coding process, with respect to a macroblock MB i (i=1 to n) which is included in a slice, in a predetermined order per slice (e.g., in order of raster scan) (see FIG. 11). The coding process is performed by the MB coding section 10, so that MB coded data is outputted.

On the other hand, the moving image decoding device 2 performs the decoding process of the MB coded data, with respect to a macroblock MB i (i=1 to n) which is included in the slice. The moving image decoding device 2 performs the decoding process in a predetermined order per slice (e.g., in order of raster scan). The decoding process is performed by the MB decoding section 20, as a result of which an MB decoded image is outputted. All of MB decoded images of the slice constituting a picture are outputted, so that one picture is completed.

In the moving image coding device 1 and the moving image decoding device 2, each of macroblocks is processed processing units into which the macroblock is divided, the processing units being not greater than each macroblock in dimension. This processing unit is hereinafter referred to as block. Note that in order to simplify the description, the following description is based on a case where a shape of the block is square.

Here, an internal process of the MB coding section 10 in the moving image coding device 1 will be described with reference to FIG. 12. As shown in FIG. 12, the MB coding section 10 of the moving image coding device 1 includes a prediction information deciding section 11, a prediction information coding section 12, a prediction image generating section 13, a prediction residual coding section 14, and an MB coded data multiplexing section 15.

First, the prediction information deciding section 11 decides an intra-prediction mode and a block size. A prediction mode indicates a method for generating the intra-prediction image, and the block size indicates a dimension of a block. Any method can be used to decide the intra-prediction mode and the block size. In general, a combination of values which minimize an RD cost which is derived in consideration of a coding amount and a residual is adopted.

The prediction information coding section 12 generates prediction information coded data for the prediction mode and the block size.

The predicted image generating section 13 performs intra prediction in the prediction mode and the block size, and outputs a predicted image based on the intra prediction. A sum of the predicted image and a prediction residual is a local decoded image of a subject block.

The prediction residual coding section 14 subjects a prediction residual to a DCT (Discrete Cosine Transform), quantizes the prediction residual obtained by the DCT, and outputs prediction residual coded data.

The MB coded data multiplexing section 15 multiplexes prediction residual coded data with prediction information coded data, and outputs thus multiplexed data as MB coded data.

Here, the following discusses internal processing of a MB decoding section 20 of the moving image decoding device 2. As shown in FIG. 13, the MB decoding section 20 of the moving image decoding device 2 is provided with a MB coded data inverse multiplexing section 21, a prediction residual decoding section 22, a prediction information decoding section 23, and the prediction image generating section 13.

First, the MB coded data inverse multiplexing section 21 separates various types of coded data from a single piece of coded data by inverse multiplexing. The MB coded data inverse multiplexing section 21 further outputs prediction residual coded data to the prediction residual decoding section 22, and outputs prediction information coded data to the prediction information decoding section 23.

Next, the following discusses operation of another module inside of the MB decoding section 20.

The prediction residual decoding section 22 decodes prediction residual coded data so as to obtain a DCT coefficient, and outputs prediction residual by an inverse quantization/inverse DCT transformation of the DCT coefficient.

The prediction information decoding section 23 derives a prediction mode and a block size from a prediction information coded data, and outputs the prediction mode and the block size thus derived.

The prediction image generating section 13 is identical with that of the moving image coding device 1. A predicted image generated by the predicted image generating section 13 is added with a predicted residual and thereby becomes a MB decoded image.

Each internal processing mentioned above is performed with all blocks contained in a subject macro block in a same order of blocks as that of the moving image coding device 1. A set of local decoded images of all blocks becomes the MB decoded image in the subject macro block.

Here, coding of a prediction mode and operation of decoding in the prediction information coding section 12 and the prediction information decoding section 23 are described with reference to FIGS. 14 through 22. First of all, the following explains what are the prediction mode and an estimated prediction mode.

Figure 14:
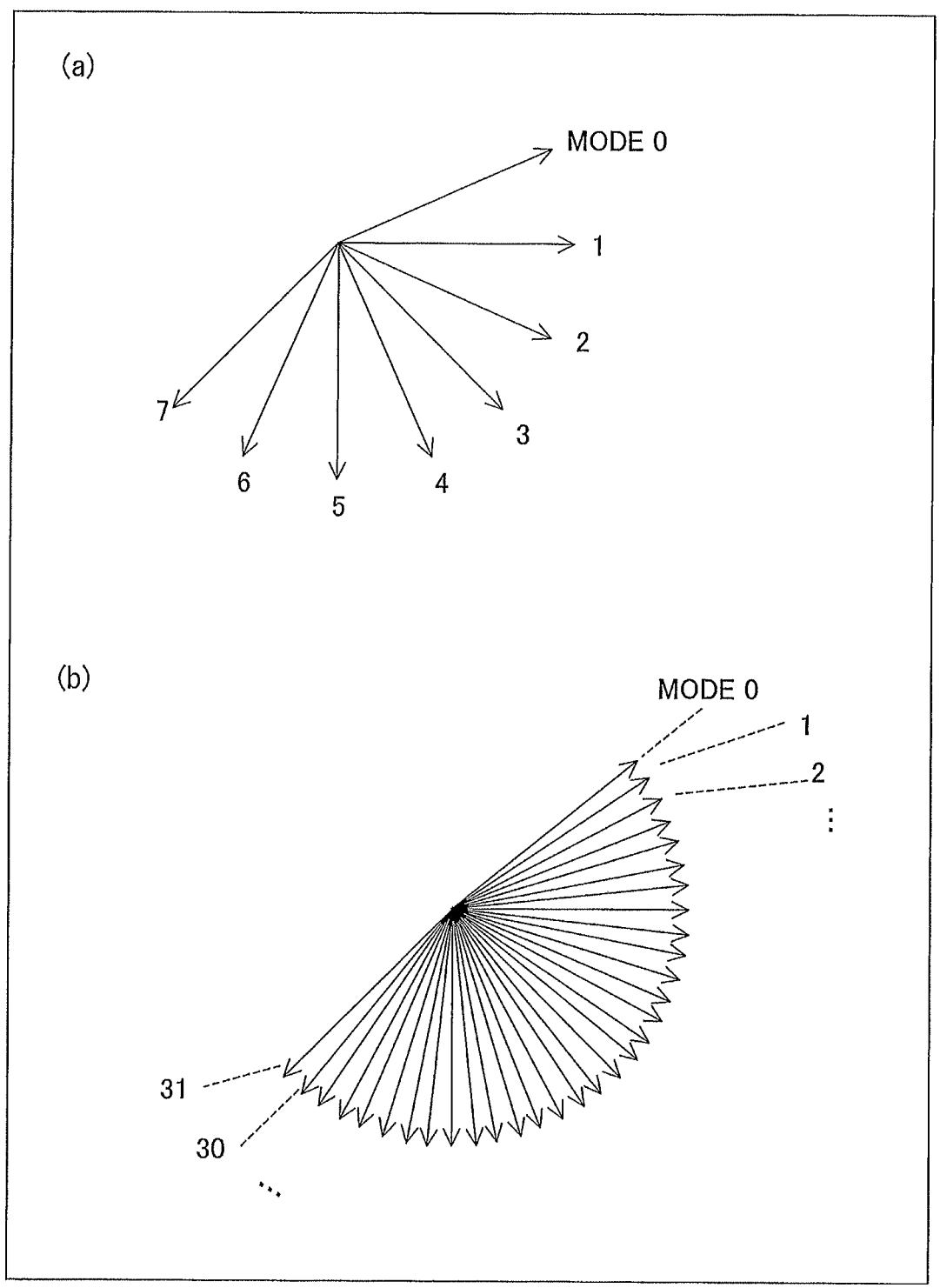
FIG. 14 is a view illustrating a specific example of a prediction mode which is associated with directions. (a) of FIG. 14 illustrates eight types of prediction directions, and (b) illustrates 32 types of prediction directions.

The prediction mode is a parameter indicating which method for predicting is to be employed out of a plurality of methods for predicting that can be selected discretionary in intra prediction. The number of methods for predicting which can be selected as the prediction mode, namely, a total number M of prediction modes is decided according to, for example, a block size. Actual examples are, according to technique of Non-patent Literature 1, M=9 for block sizes of 4×4 and 8×8, and M=4 for a block size of 16×16. Generally, a prediction mode has two types of modes (i) for generating a predicted image by causing all pixel values to be a same value, for example, an average value of adjacent pixels and (ii) for generating a predicted image by extrapolating or interpolating each referred pixel value in a predetermined direction. FIG. 14 illustrates an actual example of a prediction mode associated with orientation. (a) of FIG. 14 is a view illustrating a case where there are 8 types in the prediction mode.

Basically, a code amount according to the total number M of prediction modes is necessary for coding of the prediction mode. For example, in a case of M=8, a code of 3 bits is simply required for selecting one of 8 prediction modes. However, because a spatial correlation between pixel values is high, correlation between values of prediction modes is also locally high. In other words, it is possible to perform an estimation of a prediction mode. It is a mechanism of an estimated prediction mode that employs the estimation of a prediction mode.

An estimated prediction mode is a prediction mode that is very likely to be selected for a certain subject block. If the estimated prediction mode of the moving image coding device 1 is identical with that of the moving image decoding device 2, it is possible to perform derivation of the estimated prediction mode by any method. For example, in Non-patent Literature 1, an estimated prediction mode for a subject block is a prediction mode having a mode value which is smaller than those of prediction modes of blocks adjacent to the subject block in an upward direction and a leftward direction.

Figure 15:
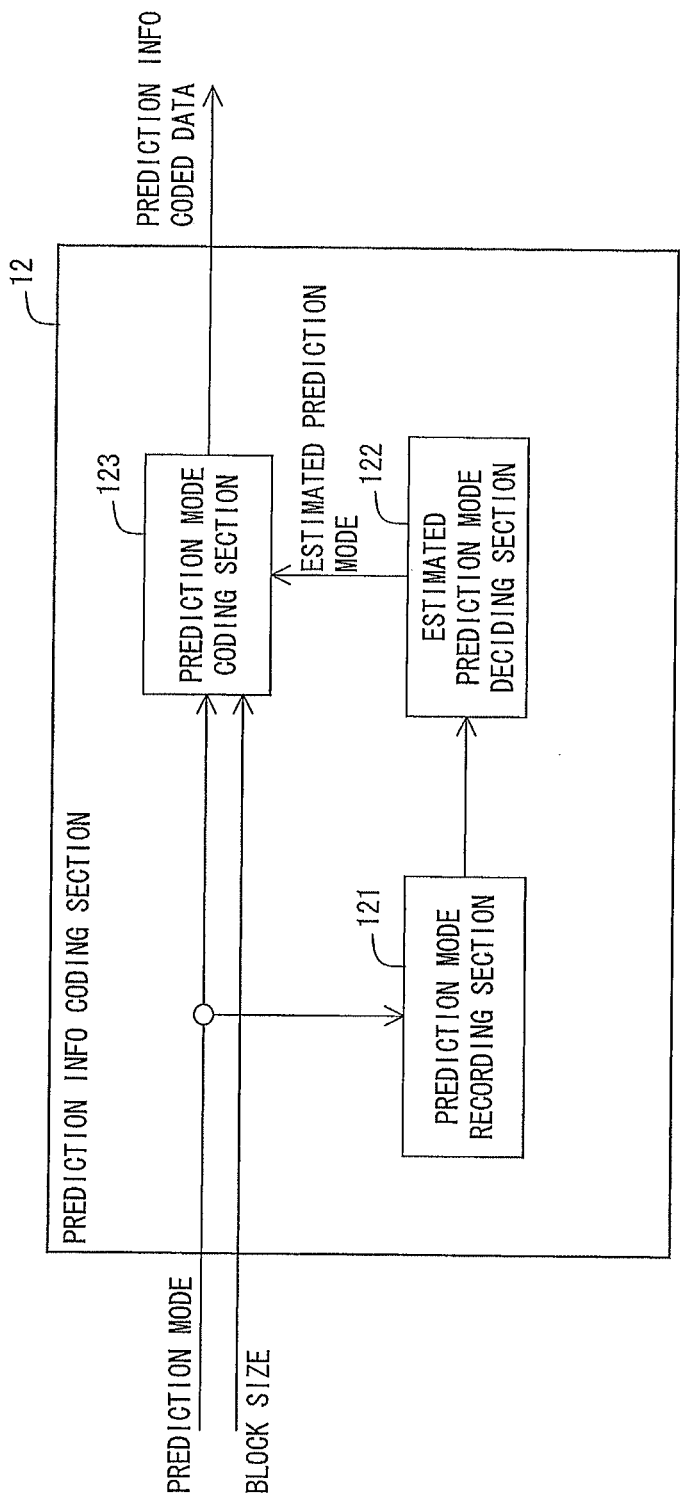
FIG. 15 is a view illustrating a configuration of a prediction information coding section 12.
Figure 16:
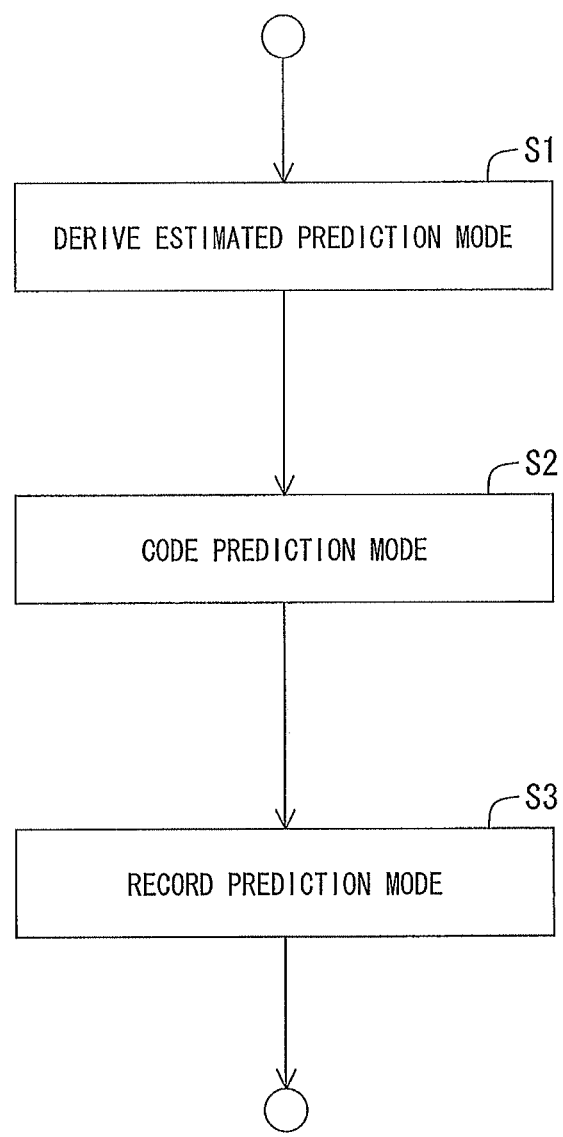
FIG. 16 is a chart illustrating a process flow in the prediction information coding section 12.
Figure 17:
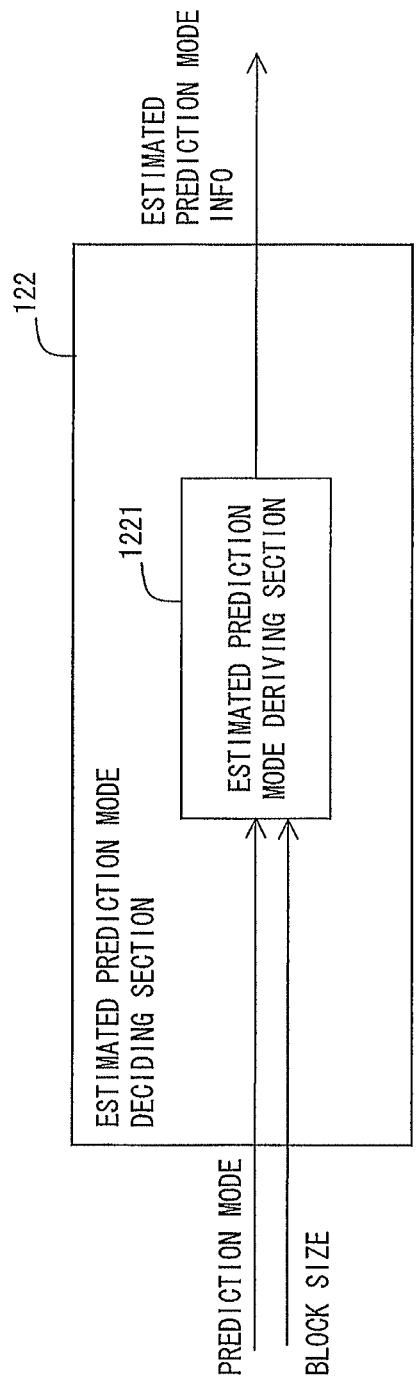
FIG. 17 is a view illustrating a configuration of an estimated prediction mode deciding section 122.

Next, a configuration and a workflow of the prediction information coding section 12 are described below with reference to FIGS. 15 and 17. FIG. 15 is a block diagram illustrating a configuration of the prediction information coding section 12. FIG. 16 illustrates a workflow of the prediction information coding section 12. As illustrated in FIG. 16, the prediction information coding section 12 performs:

(Step S1) firstly, deriving an estimated prediction mode, (Step S2) secondly coding a prediction mode by use of the estimated prediction mode, and (Step 3) recoding the prediction mode as reference for a later process.

The following discusses members composing the prediction information coding section 12 which performs these processes, with reference to FIG. 15. As illustrated in FIG. 15, the prediction information coding section 12 is provided with a prediction mode recoding section 121, an estimated prediction mode deciding section 122, and a prediction mode coding section 123.

The prediction mode recoding section 121 stores therein information of the prediction modes for the respective macro blocks which have been processed, and outputs the information when it is necessary to refer to the prediction mode.

The estimated prediction mode deciding section 122 outputs the estimated prediction mode on the basis of prediction modes of blocks adjacent to the subject block.

Figure 18:
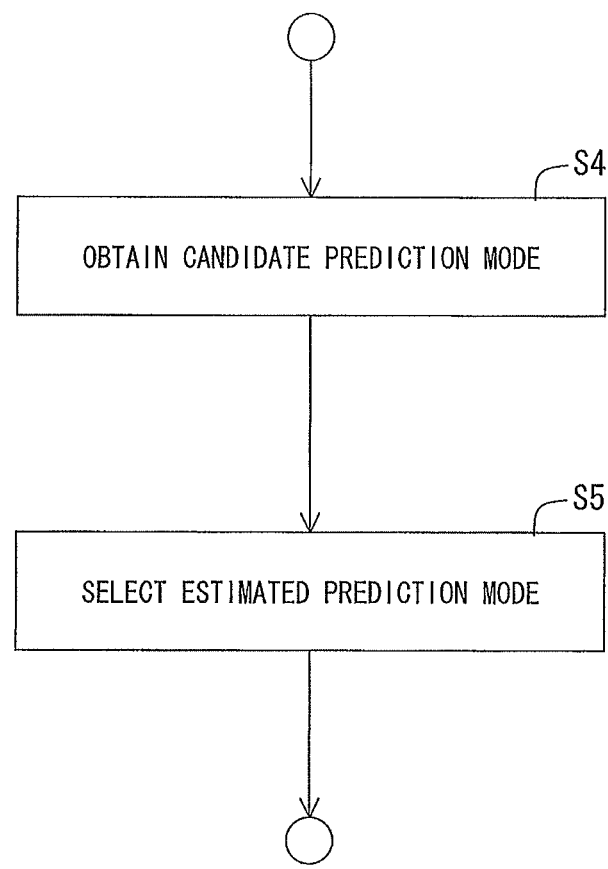
FIG. 18 is a view illustrating a process in an estimated prediction mode deriving section 1221.

Here, a detailed configuration and a workflow of the estimated prediction mode deciding section 122 can be described below with reference to FIGS. 17 and 18. FIG. 17 is a view illustrating a configuration of the estimated prediction mode deciding section 122. FIG. 18 is a view illustrating a process performed in an estimated prediction mode deriving section 1221. As illustrated in FIG. 17, the estimated prediction mode deciding section 122 is provided with the estimated prediction mode deriving section 1221. As illustrated in FIG. 18, the estimated prediction mode deriving section 1221 performs:

(Step S4) acquiring, as candidates of estimated prediction modes, prediction modes employed in blocks adjacent to the subject block in an upward direction and a leftward direction, and (Step S5) selecting, as an estimated prediction mode, an estimated prediction mode having a mode value which is smaller than those of other candidates of estimated prediction modes.

The prediction mode coding section 123 codes the prediction mode into prediction information coded data on the basis of a block size and an estimated prediction mode for the subject block, and outputs the prediction information coded data. For example, the block size is coded as side information corresponding to a method for dividing a macro block. A method for coding a prediction mode is described with reference to FIG. 19.

FIG. 19 is a table illustrating an actual example of a method for coding a prediction mode of the prediction mode coding section 123. In FIG. 19, "m" stands for a value of a prediction mode, "p" stands for a value of an estimated prediction mode, and "k=binary(x,$B_{M'}$)" stands for a conversion of a value x into a $B_{M'}$-digit bit column k. "$B_{M'}$" is the number of bits required for showing a total number M' of prediction modes (which is equal to M−1 here) that is obtained by eliminating estimated prediction modes from a total number M of prediction modes, and also is a number which can be obtained by a formula "$B_{M'}$=ceil (log (M'))".

As illustrated in FIG. 19, the prediction mode coding section 123 outputs "flag_bits" and further outputs "rem_bits" under conditions that are fulfilled by the prediction mode. The followings are three patterns of the conditions, and operations of the respective cases.

(a) In a case where a prediction mode m is equal to an estimated prediction mode p, the prediction mode coding section 123 outputs only 1 bit of "flag_bit=1" as a coded data.

(b) In a case where a prediction mode m is not equal to an estimated prediction mode p, the prediction mode coding section 123 outputs "flag_bit=0" and further outputs a bit column "rem_bits" which was derived, according to a value of m, by use of any one of the following methods.

In case of (b1) m<p, the prediction mode coding section 123 converts m into a bit column "rem_bits".

In case of (b2) m>p, the prediction mode coding section 123 converts m−1 into a bit column "rem_bits".

The description (b) is supplemented below. First, in a case of m>p, it is obviously not m=p in a case of (b). Therefore, in a case of m>p, it is advisable to displace m by m−1 and convert m−1 into a bit column so that one range of value of a "rem_bits" can be reduced enabling it to prove to be useful in reduction in code amount.

As mentioned above, conventionally, a code amount of coded data of a prediction mode used to be reduced by use of one estimated prediction mode.

Figure 20:
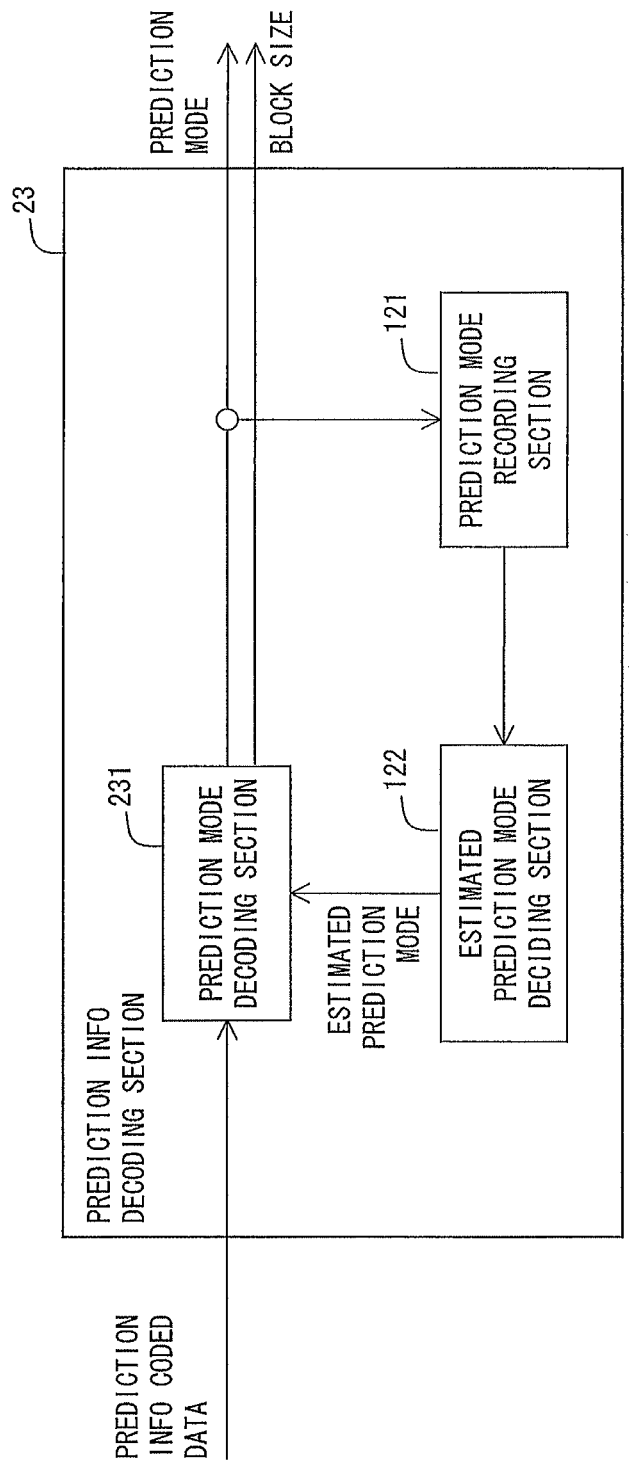
FIG. 20 is a view illustrating a configuration of a prediction information decoding section 23.
Figure 21:
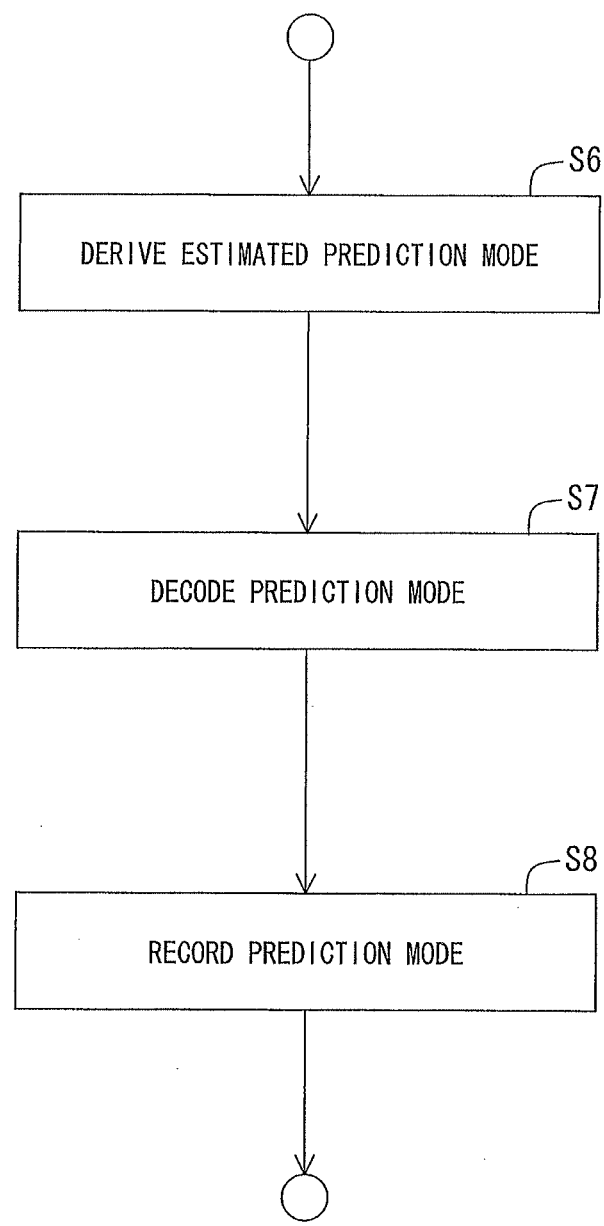
FIG. 21 is a chart illustrating a process flow in the prediction information decoding section 23.

Next, a configuration and a workflow of the prediction information decoding section 23 are described below with reference to FIGS. 20 and 21. FIG. 20 is a view illustrating a configuration of the prediction information decoding section 23. The prediction mode recoding section 121 and the estimated prediction mode deciding section 122 illustrated in FIG. 20 are identical with components of the prediction information coding section 12. FIG. 21 is a view illustrating a workflow of decoding a prediction information coded data in the prediction information decoding section 23. As shown in FIG. 21, the prediction information decoding section 23 performs:

(Step S6) firstly, deriving an estimated prediction mode by the estimated prediction mode deciding section 122, (Step S7) next, decoding a prediction mode by a prediction mode decoding section 231 in accordance with a flag decoded from the prediction information coded data, and (Step S8) further, recoding the prediction mode in the prediction mode recoding section 121 as reference for a later process.

The prediction mode decoding section 231 which decodes the prediction mode in Step S7 is described below with reference to FIG. 22.

FIG. 22 is a table illustrating an actual example of a method for decoding coded data into a prediction mode in the prediction mode decoding section 231. In FIG. 22, k represents a $B_{M'}$-digit bit column. m'=decimal(k,$B_{M'}$) represents a conversion of the $B_{M'}$-digit bit column k into an ordinary scale m'. Note that description of reference numerals identical to those of FIG. 19 is omitted here. A total number M of prediction modes in the subject block which is required for deriving the number of digits $B_{M'}$ can be derived in accordance with the block size obtained by decoding the prediction information coded data.

The prediction mode decoding section 231 first decodes "flag_bit". As shown in FIG. 22, when "flag_bit=1", the estimated prediction mode p is equal to the prediction mode m. In this case, it is not required to decode a "rem_bits", instead, the prediction mode m=p is outputted. When "flag_bit=0", the prediction mode decoding section 231 converts, as the "rem_bits", the following $B_{M'}$-digit bit coded data k into an ordinary scale m' and derives the prediction mode m according to magnitude relation between m' and p shown in the lowest row of a table of FIG. 22.

Accordingly, the conventional moving image coding devices 1 and 2 used to code/decode a prediction mode by use of one estimated prediction mode.

(Moving Image Coding Device)

Figure 1:
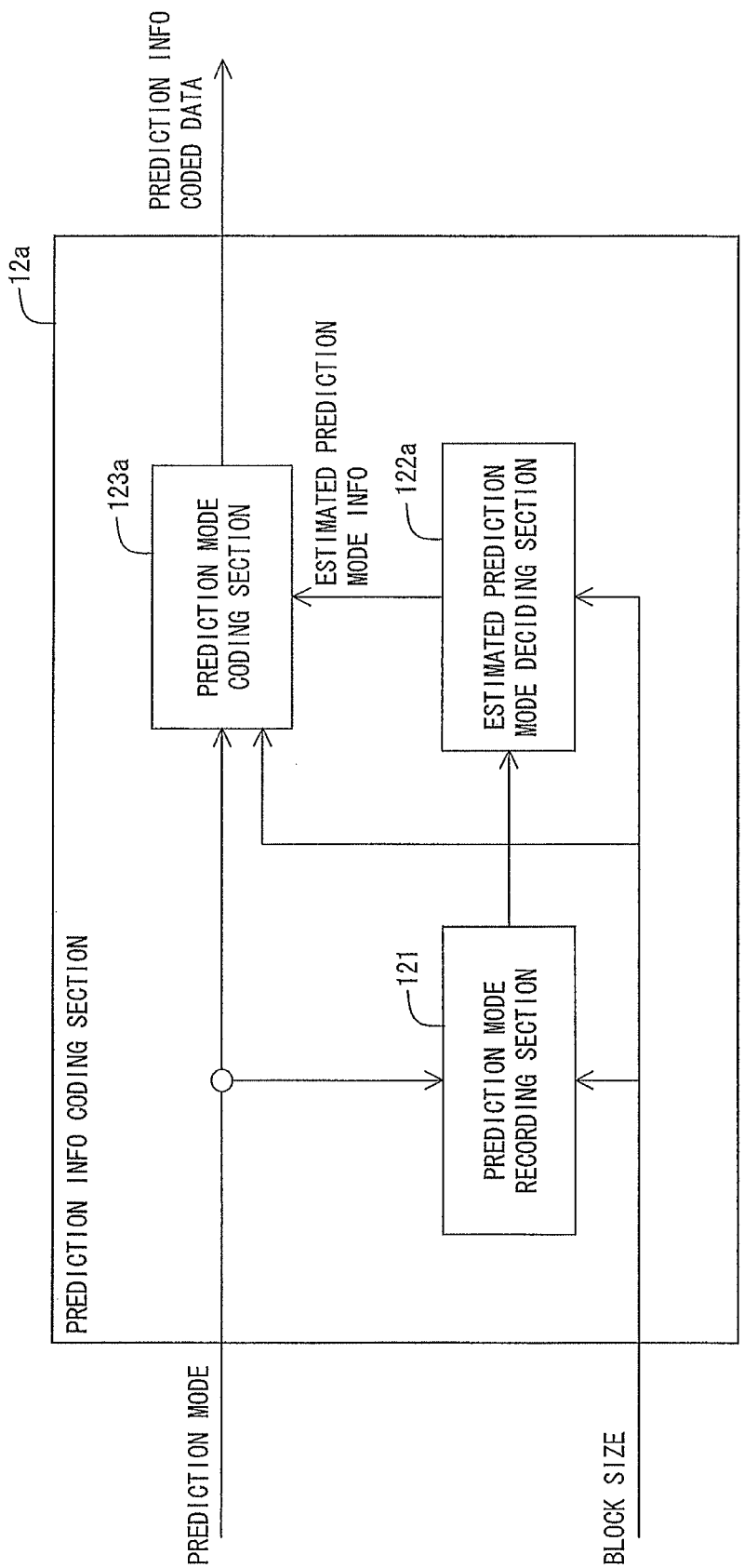
Figure 2:
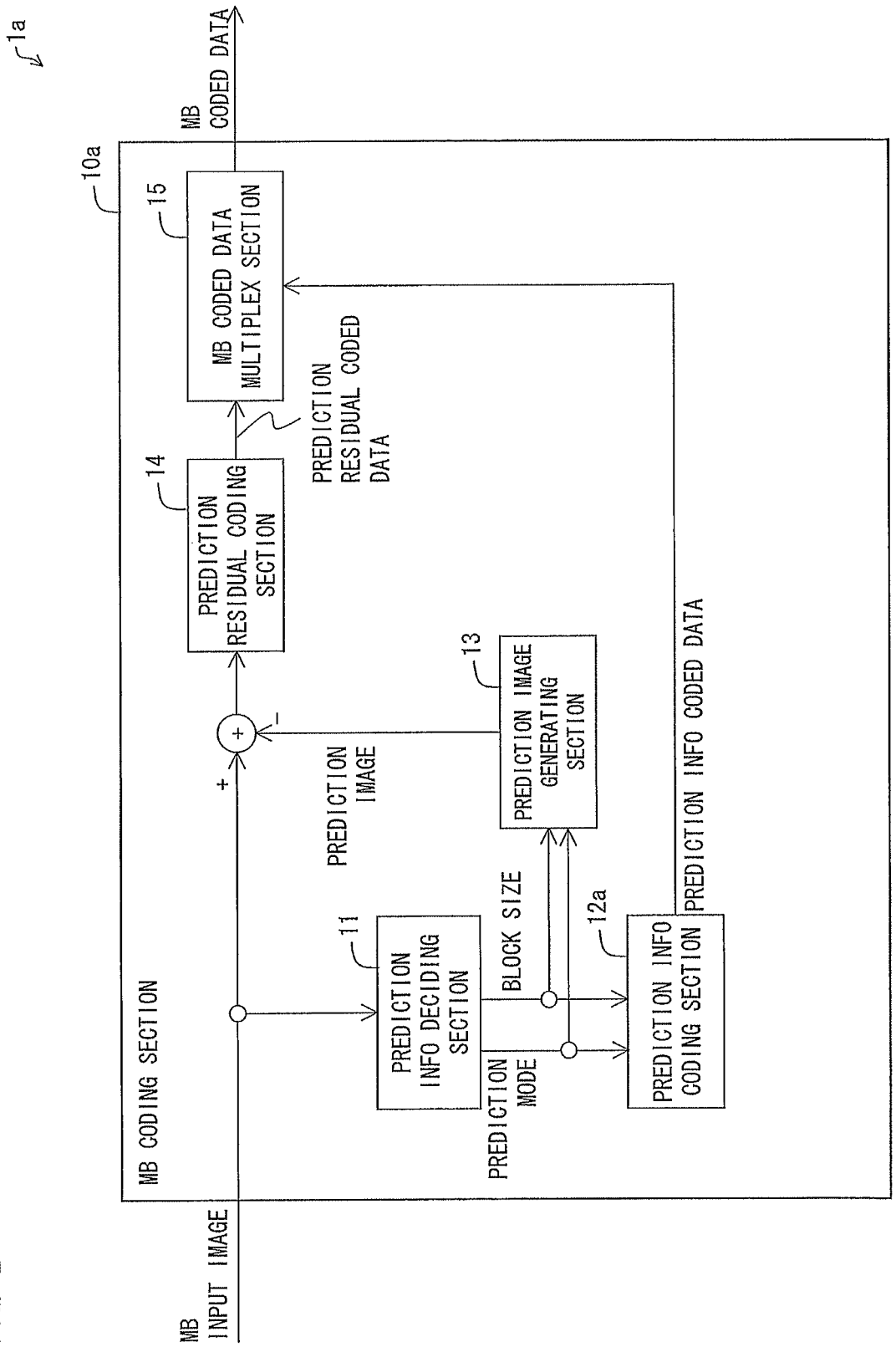

The following describes a moving image coding device 1a of an embodiment of the present invention with reference to FIGS. 1 through 7. The moving image coding device 1a of Embodiment 1 of the present invention is schematically identical to the conventional moving image coding device 1 in that each micro block of an input image is coded and the input image thus coded is outputted as coded data. The moving image coding device 1a is a moving image coding device which partially employs a technique which is adopted in H264/AVC standard. FIG. 2 is a view illustrating a configuration of an MB coding section 10a included in the moving image coding device 1a. The MB coding section 10a illustrated in FIG. 2 includes a prediction information coding section 12a instead of the prediction information coding section 12 which is included in the MD coding section 10 illustrated in FIG. 12. The prediction information coding section 12a is identical to the prediction information coding section 12 in that prediction mode information and a block size are coded and prediction information coded data is outputted. The following describes what is different between the prediction information coding section 12a and the prediction information coding section 12.

FIG. 1 is a view illustrating a configuration of the prediction information coding section 12a. The prediction information coding section 12a includes an estimated prediction mode deciding section 122a, a prediction mode coding section 123a, and a prediction mode recording section 121 which is identical to that of the moving image coding device 1. The following specifically describes the estimated prediction mode deciding section 122a and the prediction mode coding section 123a in this order.

First, the estimated prediction mode deciding section 122a is described as follows with reference to FIG. 1. The estimated prediction mode deciding section 122a illustrated in FIG. 1 is different from the estimated prediction mode deciding section 122 illustrated in FIG. 15 in that the estimated prediction mode deciding section 122a derives a plurality of estimated prediction modes. Derived estimated prediction modes, and the number of the derived estimated prediction modes, that is, an estimating number P are outputted as estimated prediction mode information. That is, the estimated prediction mode information is information which contains the estimating number P, and the estimated prediction modes which are equal in number to the estimating number P. The following explains the estimated prediction mode deciding section 122a based on an exemplary case where the estimating number P is 2. However, the estimating number is not limited to 2 but may be 1 or not less than 3. Note that use of too many estimated prediction modes is not preferable. This is because code amount is required so as to ultimately select one estimated prediction mode from the too many estimated prediction modes.

Figure 3:
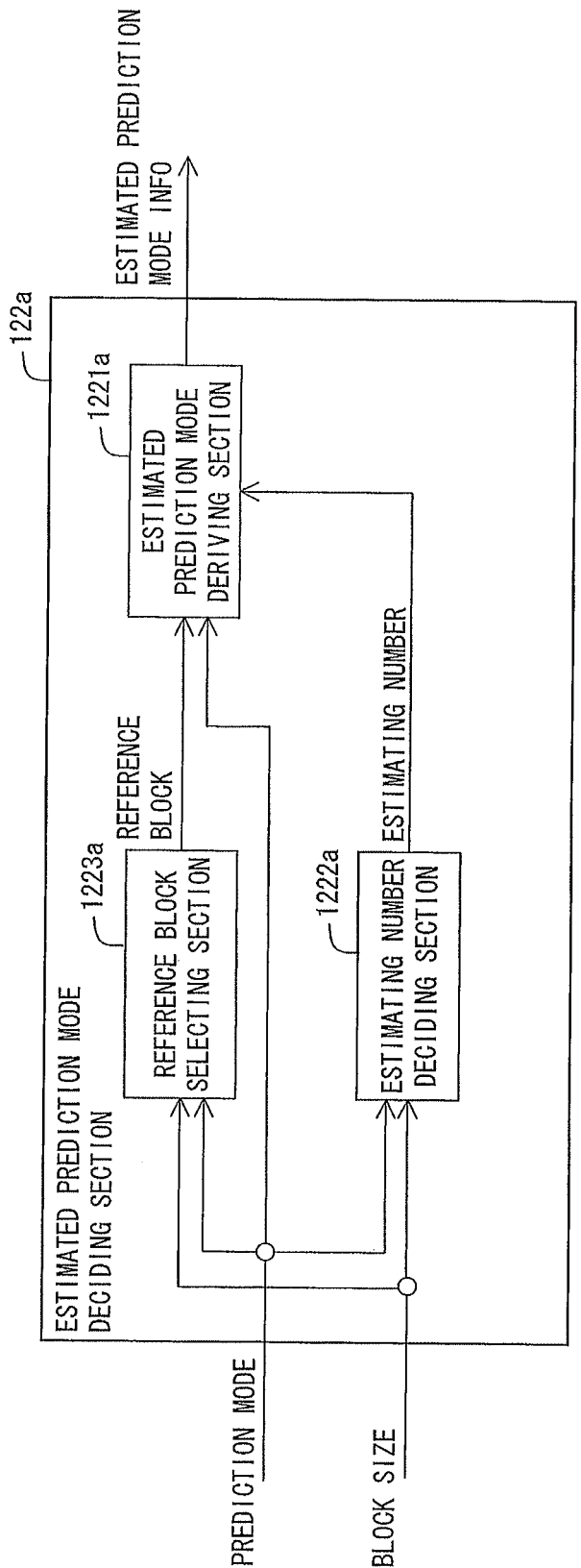

The following specifically describes a process to be carried out by the estimated prediction mode deciding section 122a, with reference to FIG. 3. FIG. 3 is a view illustrating components of the estimated prediction mode deciding section 122a.

The estimated prediction mode deciding section 122a obtains contribution degrees of respective prediction modes of adjacent blocks adjacent to a subject block, compares the contribution degrees, and derives an estimated prediction mode. A contribution degree indicates how probably a prediction mode for an adjacent block adjacent to a subject block is identical to that of the subject block. As illustrated in FIG. 3, the estimated prediction mode deciding section 122a includes an estimating number deciding section 1222a and a reference block selecting section 1223a.

Figure 4:
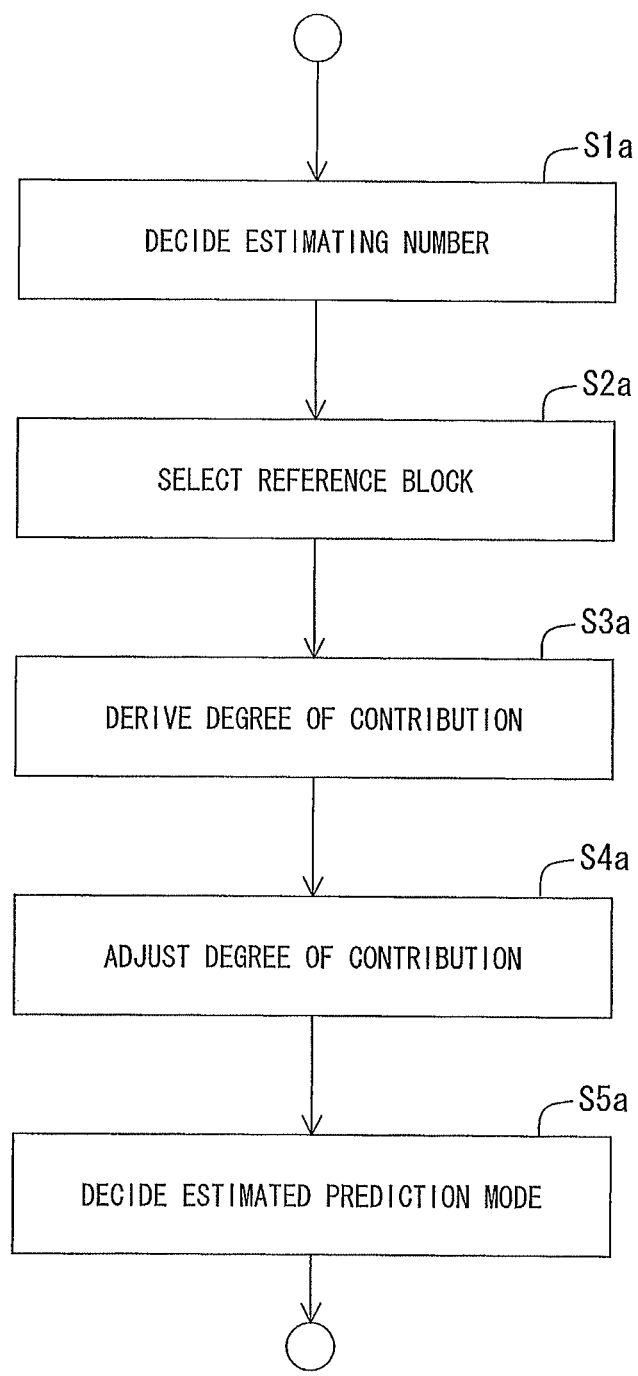
FIG. 4 is a view illustrating a procedure for deriving an estimated prediction mode.

The estimating number deciding section 1222a decides the estimating number P. The reference block selecting section 1223a selects blocks which are used so as to obtain respective estimated prediction mode candidates. An estimated prediction mode deriving section 1221a derives, from the estimated prediction mode candidates, an estimated prediction mode(s) which is(are) equal in number to the estimating number P. The following describes how the estimated prediction mode deciding section 122a derives an estimated prediction mode, with reference to FIG. 4. FIG. 4 is a view showing how the estimated prediction mode deciding section 122a derives an estimated prediction mode.

(Step S1a)

The estimating number deciding section 1222a decides an estimating number P on the basis of a total number M of prediction modes of a subject block. Specifically, assume that a predetermined threshold Mt for the total number M of prediction modes is 10. Under the assumption, the estimating number deciding section of Embodiment 1 decides that the estimating number P is 2 in a case where the total number M of prediction modes is not less than the predetermined threshold Mt, and decides that the estimating number P is 1 in a case where the total number M of prediction modes is smaller than the predetermined threshold Mt. As early described, generally, probability that an estimated prediction mode is identical to an actual prediction mode decreases as the total number M of prediction modes increases. Therefore, the probability that an estimated prediction mode is identical to an actual prediction mode can be increased by setting such that the estimating number P becomes relatively large in a block having a large total number M of prediction modes.

The total number M of prediction modes is a value decided on the basis of a block size of the subject block. For example, in a case where the block size is 4×4 or 8×8, the total number M of prediction modes is set to 9. In a case where the block size is 16×16 or 32×32, the total number M of prediction modes is set to 33. In a case where the block size is other than 4×4, 8×8, 16×16, and 32×32, the total number M of prediction modes is set to 5. It is therefore possible to derive the estimating number P on the basis of the block size instead of the total number M of prediction modes.

(Step S2a)

The reference block selecting section 1223a selects, as reference blocks which are used so as to obtain estimated prediction mode candidates, three of (i) a block adjacent to a left side of the subject block (a leftward adjacent block), (ii) a block adjacent to an upper side of the subject block (an upward adjacent block), and (iii) a block adjacent to an upper-left corner of the subject block (an left-upward adjacent block). Note that in a case where a plurality of blocks are adjacent to a side of a subject block, for example, a left side of the subject block, the top one of the plurality of blocks is selected as a reference block. In a case where a plurality of blocks are adjacent to an upper side of the subject block, the leftmost one of the plurality of blocks is selected as a reference block. The leftward adjacent block, the upward adjacent block, and the left-upward adjacent block are hereinafter referred to as a block L, a block U, and a block UL, respectively (see, for example, (a) of FIG. 6). In a case where a block cannot be selected as a reference block such as a case where a subject block is located at an edge of a screen or a case where a block to be selected has not been processed, the block may not selected or another block may be selected. For example, a block to be first processed among blocks included in a frame includes no block which can be selected as a reference block in the same frame. In the case, however, a virtual block having a predetermined default may be selected as the reference block for the block to be first processed.

(Step S3a)

The estimated prediction mode deriving section 1221a derives estimated prediction mode candidates and contribution degrees of the respective estimated prediction mode candidates on the basis of the reference blocks thus selected. The estimated prediction mode candidates and the contribution degrees are derived according to the following procedures. First, the estimated prediction mode deriving section 1221a obtains a prediction mode mL of the block L, a prediction mode mU of the block U, and a prediction mode mUL of the block UL as the estimated prediction mode candidates.

Next, the estimated prediction mode deriving section 1221a derives a contribution degrees cL of the estimated prediction mode candidate mL, a contribution degree cU of the estimated prediction mode candidate mU, and a contribution degree cUL of the estimated prediction mode candidate mUL, each of the contribution degrees cL, cU, and cUL being represented by a value of 0.0 through 1.0. The following describes, with reference to FIGS. 5 and 6, (i) a table which is used for derivation of contribution degrees and (ii) the procedures for deriving the contribution degrees. FIG. 5 exemplifies a predetermined table which is used for derivation of the contribution degrees cL, cU, and cUL of the respective prediction modes mL, mU, and mUL, in which table the total number M of prediction modes is 9. Specifically, the predetermined table shows contribution degrees of respective estimated prediction mode candidates (modes 0 through 8) for each of the leftward adjacent block L, the upward adjacent block U, and the upper-leftward adjacent block UL. According to the table illustrated in FIG. 5, for example, the contribution degree of the estimated prediction mode candidate mL=1 (mode 1) for the leftward adjacent block L is "1.0". Note here that the nine prediction modes consist of eight directions (modes 0 through 7) illustrated in (a) of FIG. 14 and one planar prediction (mode 8).

Figure 6:
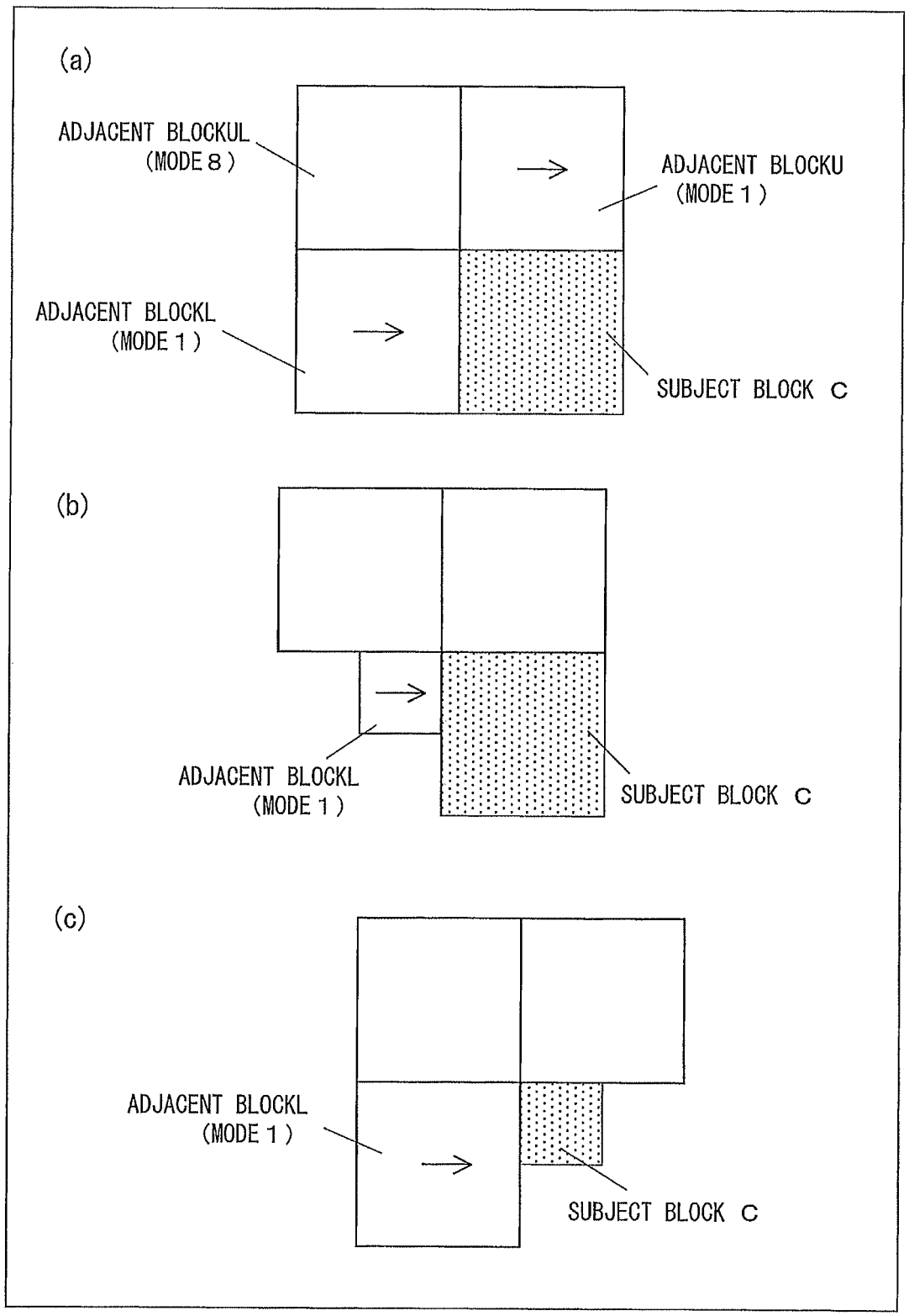
FIG. 6 is a view illustrating a specific example of a state of a subject block and adjacent blocks neighboring the subject block. (a) of FIG. 6 illustrates a case where a dimension of the subject block is identical to a dimension of each of the adjacent blocks. (b) and (c) of FIG. 6 illustrate a case where a dimension of the subject block is different from a dimension of an adjacent block on the left side of the subject block.

How to derive the contribution degrees is described with reference to FIG. 6. FIG. 6 is a view illustrating a concrete example of a state of a subject block and adjacent blocks adjacent to the subject block. (a) of FIG. 6 illustrates (i) a leftward adjacent block L whose estimated prediction mode candidate mL is 1 (mode 1), (ii) an upward adjacent block U whose estimated prediction mode candidate mU is 1 (mode 1), and (iii) an upper-leftward adjacent block UL whose estimated prediction mode candidate mUL is 8 (mode 8). The estimated prediction mode deciding section 122a decides with reference to the table of FIG. 5 that the contribution degrees cL, cU, and cUL are 1.0, 0.0, and 0.1, respectively. The estimated prediction mode candidate mL of the leftward adjacent block L is mode 1 (horizontal direction). This means that pixel values in the horizontal direction around the leftward adjacent block L are likely to be remarkably strongly correlated with each other. Therefore, the contribution degree of the leftward adjacent block L is set high in mode 1. Meanwhile, though the estimated prediction mode candidate mU of the upward adjacent block U is mode 1, the contribution degree of the upward adjacent block is set low in mode 1. This is because the upward adjacent block U is not horizontal to the subject block. In a case where the estimated prediction mode candidate mUL of the upper-leftward adjacent block UL is mode 8, pixel values do not have any correlation in a particular direction. Therefore, the contribution degree of the upper-leftward adjacent block UL is set low, that is, set to 0.1. The contribution degrees are set for respective combinations of the adjacent blocks and the modes in the table of FIG. 5, in consideration of (i) a strong correlation direction and (ii) a positional relationship between the subject block and the adjacent blocks. It is therefore possible to increase how probability an estimated prediction mode becomes identical to an actual prediction mode, by employing how much pixel values are correlated with each other.

(Step S4a)

The following describes step S4a with reference to FIG. 4.

Step S3a is a process which uses the table so that the estimated prediction mode deriving section 1221a derives the contribution degrees with a small amount of processing at high speed. The contribution degrees can be derived by other methods as long as a coder and a decoder employ an identical method for deriving the contribution degrees. Examples of the other methods include (i) a method for deriving a contribution degree by calculating the contribution degree from an angle indicated by a prediction direction and (ii) a method for further adjusting, in accordance with characteristics and states of a subject block and an adjacent block adjacent to the subject block, a contribution degree derived with reference to a table. The method for adjusting a derived contribution degree is described as step S4a as follows.

(b) and (c) of FIG. 6 each are a view illustrating a case where a subject block C has a size different from that of a leftward adjacent block L which is adjacent to a left side of the subject block C. (b) of FIG. 6 is a view illustrating a case where the leftward adjacent block L has a side which is half as long as that of the subject block C. A contribution degree cL of 1.0 can be derived from a prediction direction (mL=1: horizontal direction) of the leftward adjacent block L illustrated in (b) of FIG. 6 with reference to the table of FIG. 5. It is, however, considered that the adjacent block L has a low contribution degree for a part of the subject block C which part is not in contact with the leftward adjacent block L since the size of the subject block C is different from that of the leftward adjacent block L. Further, such difference in block size causes difference in characteristic of regions. This means there is a probability that the leftward adjacent block L has a low contribution degree. In order to prevent the contribution degree from becoming low, it is preferable to reduce the contribution degree on the basis of a ratio of a surface area of the subject block C to that of the leftward adjacent block L. Note that the ratio is calculated such that a surface area of a smaller block is always set to a numerator so as to maximize the contribution degree in a case where the subject block C has a size equal to that of the leftward adjacent block L. In a case where such reduction in contribution degree is applied to the case of (b) of FIG. 6, a coefficient is ¼, and the contribution degree cL is 0.25 (=1.0×¼).

(c) of FIG. 6 is a view illustrating a case where the leftward adjacent block L has a side which is twice as long as that of the subject block C. In the case, it is also preferable to adjust the contribution degree of the leftward adjacent block L in consideration of a probability that the contribution degree is not actually high, as with the case of (b) of FIG. 6. In a case where such adjustment of the contribution degree is applied to the case of (c) of FIG. 6, a coefficient is ¼, and the contribution degree cL is 0.25 (=1.0×¼). By carrying out such adjustment, the estimated prediction mode deriving section 1221a can avoid overestimating the contribution degree in the case of the difference in block size.

The method for adjusting a contribution degree is applicable to a case where a process unit does not have a square shape.

(Step S5a)

Lastly, the estimated prediction mode deriving section 1221a compares the contribution degrees cL, cU, and cUL of the respective estimated prediction mode candidates mL, mU, and mUL with one another. The estimated prediction mode deriving section 1221a then derives P estimated prediction mode(s) which is(are) in order of decreasing the contribution degrees, the P being indicated by an estimating number. For example, in a case where the estimating number P is 2, the estimated prediction mode deriving section 1221a outputs a first estimated prediction mode p1 and a second estimated prediction mode p2. In (a) of FIG. 6, the contribution degree cL is 1.0, the contribution degree cU is 0.0, and the contribution degree cUL is 0.1. In the case of (a) of FIG. 6, the estimated prediction mode candidate mL (mode 1) and the estimated prediction mode candidate mUL (mode 8) are outputted as the first estimated prediction mode p1 and the second estimated prediction mode p2, respectively.

The estimated prediction mode deriving section 1221a outputs the P estimated prediction mode(s) and the estimating number P as estimated prediction mode information. Such ranking in order of the contribution degrees makes it possible to derive a most probable prediction mode as the first estimated prediction mode, and other probable prediction modes as second and latter estimated prediction modes.

A process to be carried out by the estimated prediction mode deriving section 1221a is not limited to the above-described explanation. The following exemplifies other methods carried out in the respective steps.

In step S1a, how to decide the total number M of prediction modes, and how much a value of the total number M of prediction modes is may not be necessarily decided as early described. The total number M of prediction modes may be explicitly set for each subject block by, for example, (i) employing a flag for explicitly selecting the total number M of prediction modes of 9 and the total number M of prediction modes of 17 and (ii) deciding a value of the flag prior to a prediction mode for the each subject block, (or by decoding in a case of a decoder). Such setting of the total number M of prediction modes makes it possible to adaptively set the total number M of prediction modes in accordance with a characteristic of an image without depending on a block size. Such setting of the total number M of prediction modes without depending on the block size allows the estimated prediction mode deriving section 1221a to be configured not to use the block size.

Further, in step S1a, how to obtain the estimating number P is not limited to the above-described explanation. It is assumed in Embodiment 1 that the total number of prediction modes is decided on the basis of a block size. It is therefore possible to derive the estimating number P, for example, on the basis of a block size of a subject block. Specifically, in a case where the block size is 16×16 or 32×32, the estimating number P is set to 2. In other cases, the estimating number P is set to 1. Alternatively, the estimating number P can be derived on the basis of a result obtained by comparing a block size of a subject block with a block size of a reference block. Specifically, in a case where a reference block includes a block whose block size is equal to that of a subject block, the estimating number P is set to 1. This is because in the case, an estimated prediction mode candidate having a high contribution degree is present, whereby probability that an estimated prediction mode is identical to an actual prediction mode is increased. In other cases, the estimating number P is set to a relatively large number, that is, 2. This is because the estimated prediction mode is unlikely to be identical to the actual prediction mode.

The estimating number P is obtained for each block in step S1a, as early described. Alternatively, in step S1a, the estimating number P can be set to an optimal value for a process unit larger than a block, such as a slice or a picture, though. In a case where the estimating number P is obtained for the process unit larger than the block, an estimating number Pd of a default for the slice or the picture is set and coded, and the estimating number Pd is referred to in step S1a.

In step S2a, blocks to be selected are not limited to the above-described three blocks. The three blocks are suitable as comparison blocks in a case where a process in raster scan order from a left upward direction to a right downward direction is assumed. This is because the three blocks have been already processed before the subject block is processed, that is, prediction modes of the three blocks have been decided. Instead of the three blocks, for example, other blocks such as a block adjacent to an upper right side of the subject block or a block adjacent to a right side or a lower left side of the subject block can be selected as long as the other blocks have been already processed.

Further, in step S2a, for example, in a case where a plurality of blocks are adjacent to a side of a subject block, the largest one of the plurality of blocks may be selected. Alternatively, in the case, all of the plurality of blocks may be selected. Further, the reference block selecting section 1223a may select a block(s) close to the subject block, such as a block adjacent to an adjacent block adjacent to the subject block, a block included in a predetermined range from the subject block, or all blocks which have been processed before the subject block is processed. Such change in range of reference blocks to be selected makes it possible to adjust flexibility to change in local image characteristic.

Further, in step S2a, the reference blocks to be selected can be changed in accordance with the estimating number P supplied by the estimating number deciding section 1222a. For example, only in a case where the estimating number P is 1, the leftward adjacent block and the upward adjacent block may be selected as the reference blocks.

An order of carrying out step S1a and step S2a can be reversed according to (i) details of step S1a and step S2a or (ii) mutual dependence of pieces of output data of the respective steps of S1a and S2a.

In step S3a, the values in the table are not limited to an example of FIG. 5. Note that it is preferable to set each of the values in consideration of (i) a prediction direction of an adjacent block adjacent to a subject block and (ii) a positional relationship between the subject block and the adjacent block in a case where an estimated prediction mode candidate is derived for each adjacent direction of a block. Further, how to derive an estimated prediction mode candidate is not limited to the above-described method. Particularly, in a case where a plurality of reference blocks are selected, it is possible to reduce an influence of change in local image characteristic during derivation of an estimated prediction mode, by employing, as the estimated prediction mode, a prediction mode which has been statistically derived from a group of the plurality of reference blocks. In step S2a, for example, in a case where all blocks adjacent to a left side of a subject block (leftward adjacent blocks), and all blocks adjacent to an upper side of the subject block (upward adjacent blocks) are selected as reference blocks, most ones of prediction modes of the respective leftward adjacent blocks, and most ones of prediction modes of the respective upward adjacent blocks may be derived as the estimated prediction mode candidate. Instead of the most prediction modes, a prediction mode which is closest to an average prediction direction may be derived as the estimated prediction mode candidate.

Further, in step S3a, the table may be switched over in accordance with the estimating number P. For example, in a case where the reference block selecting section 1223a changes, in accordance with the estimating number P, how to select a reference block, the table is switched over in accordance with a reference block to be selected.

In step S4a, a contribution degree can be adjusted on the basis of a measure other than a surface area ratio. For example, the contribution degree can be adjusted on the basis of a ratio of a length of a side of a subject block to a length of a side of an adjacent block adjacent to the subject block, the sides being in contact with each other. It is possible to obtain a contribution degree cL of 0.5 by, in step S4a, adjusting the contribution degree cL at a ratio of 1/2 which is the ratio of the length of the side of the subject block to the length of the side of the adjacent block. How to adjust a contribution degree on the basis of the ratio is useful for a case where a process unit is not a square shape. Alternatively, the contribution degree may be adjusted (i) according to a distance between a subject block and a reference block or (ii) on the basis of the number of reference blocks which have been used so as to derive one estimated prediction mode candidate.

Instead of adjusting the contribution degree by calculating it in step S4a, various determinations which are to be carried out in step S4a are carried out prior to step S3a, and the table to be used in step S3a, itself, may be changed on the basis of results of the various determinations.

In step S5a, the estimating number P may be changed on the basis of (i) a result obtained by deriving an estimated prediction mode candidate or (ii) a result obtained by deriving a contribution degree. For example, in a case where the estimating number P is 2 and three estimated prediction mode candidates are identical to one another (m1), only one type of estimated prediction mode is present. In the case, by employing the m1 as a first estimated prediction mode and changing the estimating number P to 1, it is possible to avoid wastefully using a plurality of identical estimated prediction modes. As another example, in a case where (i) the estimating number P is 2, (ii) estimated prediction mode candidates mL, mU, and mUL are different from one another, and (iii) contribution degrees cL, cU, and cUL are equal to one another, it is determined that the estimated prediction mode candidates mL, mU, and mUL have an equal contribution degree. In the case, wastefully generating an estimated prediction mode candidate which is not to be used as an estimated prediction mode though the estimated prediction mode candidate has the equal contribution degree can be avoided by (i) changing the estimating number P to 3 and (ii) setting the estimated prediction mode candidates mL, mU, and mUL to a first estimated prediction mode p1, a second estimated prediction mode p2, and a third estimated prediction mode p3, respectively (the order of the estimated prediction mode candidates mL, mU, and mUL is not limited to this).

Further, in step S5a, some or all of the estimated prediction modes may be derived on the basis of something other than the estimated prediction mode candidates for example, on the basis of the estimating number P. In the case, the first estimated prediction mode through the P-1-th estimated prediction mode are derived on the basis of the result obtained by deriving a contribution degree, as early described, and the P-th estimated prediction mode may be set to mode 8. This allows the estimated prediction modes to include a prediction mode which is generally in frequent use, without influence by local image characteristic.

As further another example of step S5a, in a case where the estimating number P is 2, the first estimated prediction mode is derived on the basis of the result obtained by deriving a contribution degree, and the second estimated prediction mode may be set to another prediction mode having a value approximate to that of the first estimated prediction mode. Specifically, a prediction mode having the second largest mode value following the largest mode value of the first estimated prediction mode may be set to the second estimated prediction mode. Alternatively, one of prediction modes each of which is correlated with a main direction such as a horizontal direction, a vertical direction, or a direction of an angle of 45°, which one is closest to the first estimated prediction mode, may be set to the second estimated prediction mode. It is therefore possible to increase how probable an estimated prediction mode becomes identical to an actual prediction mode even in a case where the estimated prediction mode and the actual prediction mode are in the substantially same direction but have respective different values, by setting, to the second estimated prediction mode, a prediction direction which is substantially identical but different from that of the first estimated prediction mode.

The process to be carried out by the estimated prediction mode deriving section 1221a may be changed in accordance with the estimating number P. For example, in a case where the estimating number P is not less than 2, steps S1a through S5s are carried out as they are. In a case where the estimating number P is 1, a simple method which is the same as that of a conventional technique may be carried out, that is, one of a prediction mode for a leftward adjacent block and a prediction mode for an upward adjacent block, which one has a smaller value, may be set to an estimated prediction mode.

The following specifically describes another example of the process to be carried out by the estimated prediction mode deriving section 1221a. The estimated prediction mode deriving section 1221a may obtain an estimated prediction mode by ranking and comparing prediction modes of respective adjacent blocks. For example, the prediction modes of the respective adjacent blocks are ranked in order of increasing values of the respective prediction modes or in order of decreasing probabilities of generation of the respective prediction modes. The ranking is carried out with elimination of duplication of a prediction mode having a value equal to that of another prediction mode in the prediction modes or a prediction mode having a probability of generation equal to that of another prediction mode in the prediction modes. P prediction mode(s), from the first prediction mode, of the prediction modes of the respective adjacent blocks may be employed as an estimated prediction mode(s). The order may be coded and transmitted by a coder (the moving image coding device 1a). Alternatively, the order may be derived from information decoded by a decoder (a moving image decoding device 2a). Note, however, that such elimination of the duplication of the prediction mode causes a case where the number of estimated prediction modes is less than P even in a case where all prediction modes of the respective adjacent blocks are employed as the estimated prediction modes. This is because the number of prediction modes to be ranked is reduced by such elimination of the duplication of the prediction mode. In order to deal with the case, a predetermined prediction mode which has not been employed as the estimated prediction modes may be added so that the number of estimated prediction modes becomes P. The predetermined prediction mode to be added can be determined so that the coder and the decoder employ an identical prediction mode. Examples of the predetermined prediction mode include (i) a DC mode, (ii) a Planar mode, (iii) a horizontal or vertical direction prediction mode, (iv) a prediction mode whose direction is closest to an intermediate direction between a direction indicated by a prediction mode for a leftward adjacent block and a direction indicated by a prediction mode for an upward adjacent block, and (v) a prediction mode whose direction is close to that of a prediction mode which is employed as an estimated prediction mode. Note also that the duplication of the prediction modes is not necessarily duplication of prediction modes which are completely identical to another prediction mode but can be duplication of prediction modes whose directions are not greatly different from each other or prediction modes obtained by the DC mode with the Planar mode, respectively.

The following describes the prediction mode coding section 123a with reference to FIG. 1. The prediction mode coding section 123a codes a prediction mode on the basis of a block size and estimated prediction mode information to obtain prediction information coded data, and then outputs the prediction information coded data. This is specifically explained with reference to FIG. 7.

FIG. 7 is a table showing a concrete example of how the prediction mode coding section 123a codes a prediction mode in a case where an estimating number P is 2. The estimating number P is supplied to the prediction mode coding section 123a as a piece of the estimated prediction mode information. In FIG. 7, $p_{min}$ represents either one of a first estimated prediction mode p1 and a second estimated prediction mode p2 which has a smaller value, and $p_{max}$ represents either one of the first estimated prediction mode p1 and the second estimated prediction mode p2 which has a larger value. Other reference numerals which have been already described are not described here.

The prediction mode coding section 123a outputs a flag_bit0, and further outputs a flag_bit1 and a rem_bits according to conditions met by a prediction mode m (see FIG. 7). The conditions, and operations carried out by the prediction mode coding section 123a under the respective conditions are described as follows.

(a) In a case where the prediction mode m is identical to the first estimated prediction mode p1, the prediction mode coding section 123a outputs merely a one-bit flag_bit0=1 as coded data.

(b) In a case where the prediction mode m is not identical to the first estimated prediction mode p1 but is identical to the second estimated prediction mode p2, the prediction mode coding section 123a outputs a flag_bit0=0 and a two-bit flag_bit1=1.

(c) In a case where the prediction mode m is neither identical to the first estimated prediction mode p1 nor identical to the second estimated prediction mode p2, the prediction mode coding section 123a outputs a flag_bit0=0 and a flag_bit1=0, and further outputs a bit string rem_bits derived by any one of the following methods in accordance with the value of the prediction mode m.

(c1) In a case where $m<p_{min}$, the prediction mode coding section 123a converts the prediction mode m into a bit string rem_bits.

(c2) In a case where $p_{min}<m<p_{max}$, the prediction mode coding section 123a converts a prediction mode m−1 into a bit string rem_bits.

(c3) In a case where $p_{max}<m$, the prediction mode coding section 123a converts a prediction mode m−2 into a bit string rem_bits.

A process carried out by the prediction mode coding section 123a under the condition (c) is useful for improvement of a coding efficiency by eliminating a plurality of estimated prediction modes from a range of values of the rem_bits so as to reduce the range, as with a process carried out by the conventional prediction mode coding section 123.

The following describes another concrete example of how the prediction mode coding section 123a codes a prediction mode. In the case where the estimating number P is 2, the prediction mode coding section 123a outputs (i) a flag flag_bitG indicating that a prediction mode is identical to any one of estimated prediction modes which is included in a group G of the estimated prediction modes and (ii) an identifier mpm_idx on the basis of which one of the estimated prediction modes is selected. Conditions and operations carried out by the prediction mode coding section 123a under the respective conditions are described as follows.

(d) In a case where the prediction mode m is identical to any one of the estimated prediction modes which is included in the group $G_1$ that is, the first estimated prediction mode p1 or the second estimated prediction mode p2, the prediction mode coding section 123a outputs a flag_bitG=1 as coded data. The prediction mode coding section 123a further outputs the identifier mpm_idx indicative of an estimated prediction mode identical to the prediction mode m. In the case where the estimating number P is 2, the identifier mpm_idx is a one-bit identifier. Note that in a case where the first estimated prediction mode p1 is identical to the second estimated prediction mode p2, the value of the prediction mode m is obvious. It is therefore possible to improve the coding efficiency by not coding the identifier mpm_idx.

(e) In a case where the prediction mode m is neither identical to the first estimated prediction mode p1 nor identical to the second estimated prediction mode p2, the prediction mode coding section 123a outputs a flag_bitG=0 as coded data. The prediction mode coding section 123a further derives and outputs a rem_bits by any one of the methods (c1) through (c3) in accordance with the value of the prediction mode m.

Thus, the prediction mode coding section 123a generates coded data from a prediction mode on the basis of a plurality of estimated prediction modes. In a case where a subject block actually has any one of the plurality of estimated prediction modes, the prediction mode coding section 123a can code the prediction mode with less code amount. Further, employment of the plurality of estimated prediction modes makes it possible to increase how probable an estimated prediction mode is identical to an actual prediction mode even in a block having a large number of prediction modes. Embodiment 1 described the case where the estimating number P is 2. In a case where the estimating number P is 1, the prediction mode coding section 123a carries out coding identical to that carried out by the prediction mode coding section 123. Even in a case where the estimating number P is not less than 3, the prediction mode coding section 123a can code a prediction mode by carrying out, by use of three or more-bit flags that are similar to the respective flag_bit0 and flag_bit1, coding identical to that carried out in the case where the estimating number P is 2.

That is, even in the case where the estimating number P is not less than 3, the prediction mode coding section 123a can code a prediction mode as with the case where the estimating number is 2 (i) by use of the flags that are similar to the respective flag_bit0 and flag_bit1 and further (ii) by eliminating the estimated prediction modes from the range of the values of the rem_bits so as to reduce the range as with the condition (c). Alternatively, even in the case where the estimating number P is not less than 3, the prediction mode coding section 123a can code a prediction mode by carrying out the method described in the another concrete example by use of the flag flag_bitG and the identifier mpm_idx which has a range of values in accordance with the estimating number P.

Thus, it is possible to reduce whole code amount of prediction modes in coded data to be outputted from the moving image coding device 1a by (i) coding in advance information indicative of whether or not an actual prediction mode is identical to any one of a plurality of estimated prediction modes and (ii) coding the actual prediction mode only in a case where the actual prediction mode is not identical to any one of the plurality of estimated prediction modes.

Thus, the moving image coding device 1a derives a plurality of ranked estimated prediction modes which are more accurate than a conventional technique, on the basis of contribution degrees of respective estimated prediction mode candidates as which prediction modes of respective adjacent blocks adjacent to a subject block are employed. Further, employment of the plurality of ranked estimated prediction modes for generation of coded data from the prediction modes makes it possible to increase a probability of coding with less code amount by use of a second estimated prediction mode even in a case where a first estimated prediction mode is not identical to a prediction mode for the subject block, thereby improving the coding efficiency.

(Moving Image Decoding Device)

Figure 8:
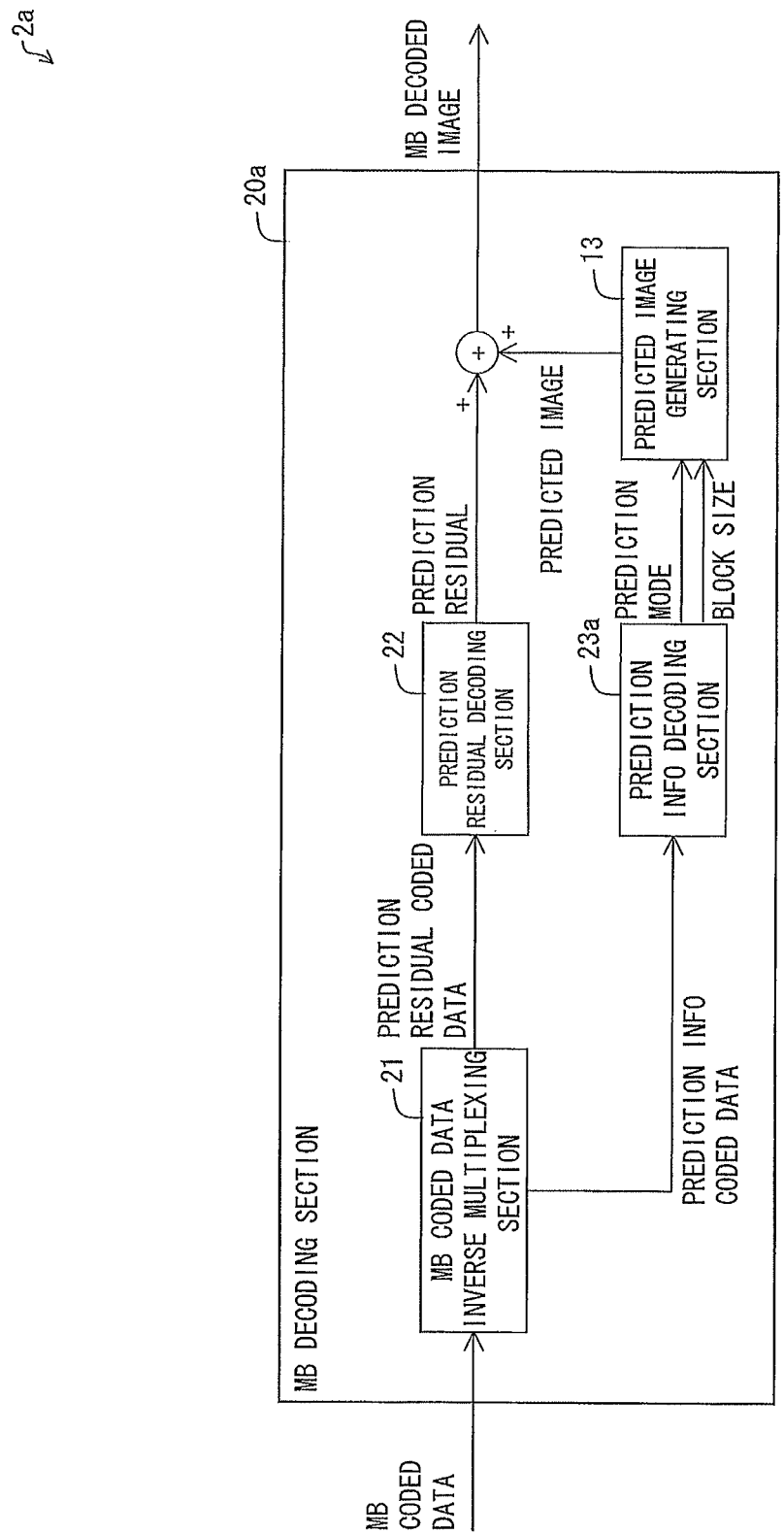
Figure 9:
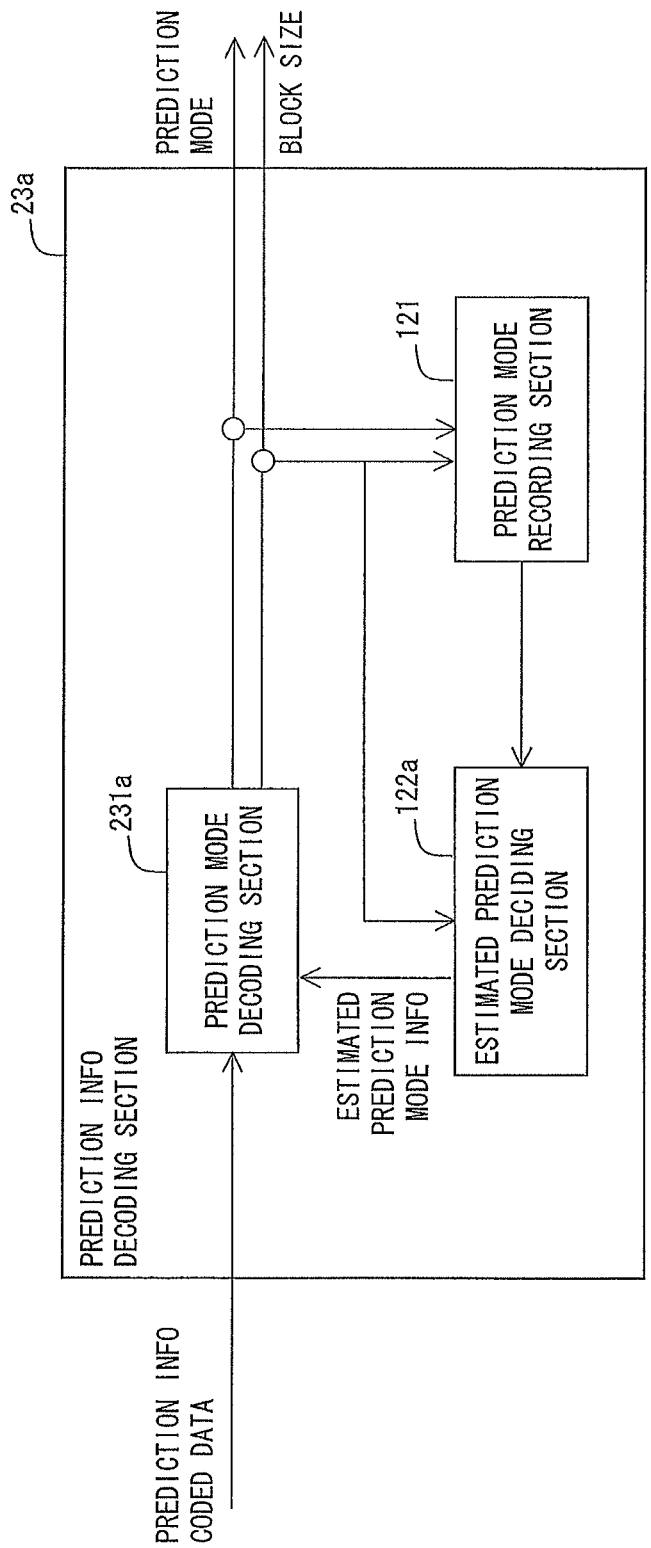

The following explains a moving image decoding device 2a according to an embodiment of the present invention, with reference to FIGS. 8 through 10. In brief, the moving image decoding device 2a of the first embodiment of the present invention is a device that, like a conventional moving image decoding device 2, decodes coded data of each macro block unit and outputs a decoded image. The moving image decoding device 2a is a moving image decoding device part of which utilizes a technique adopted in H.264/AVC. FIG. 8 is a diagram illustrating a configuration of an MB decoding section 20a in the moving image decoding device 2a. The MB decoding section 20a illustrated in FIG. 8 is obtained by replacing, with a prediction information decoding section 23a, the prediction information decoding section 23 in the MB decoding section 20 as illustrated in FIG. 13. The prediction information decoding section 23a decodes prediction information decoded data and outputs a prediction mode and a block size. In this point, the prediction information decoding section 23a is similar to the prediction information decoding section 23 of the moving image decoding device 2. The following specifically explains a prediction mode decoding method which is different from that of the prediction information decoding section 23.

FIG. 9 is a diagram illustrating a configuration of the prediction information decoding section 23a. The prediction information decoding section 23a includes a prediction mode decoding section 231a, and the prediction mode recoding section 121 and the estimated prediction mode deciding section 122a which are described above.

The following explains the prediction mode decoding section 231a. The prediction mode decoding section 231a first decodes a block size from prediction information coded data. Then, the prediction mode decoding section 231a decodes a prediction mode from the prediction information coded data in accordance with estimated prediction mode information that has been derived by the estimated prediction mode deciding section 122a using thus decoded block size. This is explained more specifically, with reference to FIG. 10.

FIG. 10 is a table showing a specific example of a prediction mode decoding method in the prediction mode decoding section 231a in a case where the estimating number P=2. Explanations of reference signs mentioned above are omitted here.

The prediction mode decoding section 231a first decodes flag_bit0. As shown in FIG. 10, when flag_bit0=1, an estimated prediction mode p1 is equal to the prediction mode m and it is unnecessary to decode flag_bit1 and rem_bits. When flag_bit0=0, the prediction mode decoding section 231a then decodes flag_bit1. When flab_bit1=1, an estimated prediction mode p2 is equal to a prediction mode m and it is unnecessary to decode rem_bits. When flag_bit0=0 and flag_bit1=0, no estimated prediction mode is identical to the prediction mode. In this case, the prediction mode decoding section 231a converts subsequent $B_{M'}$-bit coded data k as rem_bits into a decimal number m', and derives the prediction mode m in accordance with magnitude relations between m' and $p_{min}$ and between m' and $p_{max}$.

As described above, the prediction mode decoding section 231a decodes a prediction mode from coded data, in accordance with a plurality of estimated prediction modes. Here, a case where the estimating number P=2 is explained. When P=1, the prediction mode decoding section 231a should perform decoding in the same manner as the prediction mode decoding section 231. When P≥3, decoding should be carried out, for example, in the same manner as in a case where P=2. In this case where P≥3, decoding of a prediction mode is possible by providing, in coded data, a flag having three or more bits that are similar to flag_bit0 and flag_bit1.

The same effect as described above can be obtained, even when the following configuration other than a configuration including flag_bit0 and flag_bit1 is alternatively employed as a configuration of a flag that indicates whether or not a prediction mode and each estimated prediction mode are identical. In this alternative configuration, for example, when the estimating number P=2, the prediction mode decoding section 231a first decodes a flag, that is, flag_bitG. This flag_bitG indicates that an actual prediction mode is identical to one estimated prediction mode in a group G including two estimated prediction modes. flag_bitG=0 indicates that neither one of the two estimated prediction modes of the group G is identical to the actual prediction mode. Thus, a prediction mode is decided by decoding rem_bits. Meanwhile, flag_bitG=1 indicates that one of the two estimated prediction modes of the group G is identical to the actual prediction mode. In this case, the prediction mode decoding section 231a further decodes an identifier mpm_idx that indicates which one of the two estimated prediction modes of the group G is identical to the actual prediction mode. When the identifier mpm_idx=0, the estimated prediction mode p1 is identical to the actual prediction mode. Meanwhile, when mpm_idx=1, the estimated prediction mode p2 is identical to the actual prediction mode. Similarly, even when the estimating number 3, which estimated prediction mode is identical to an actual prediction mode can be indicated by using an identifier mpm_idx in a case where flag_bitG=1. Note that a code length of the identifier mpm_idx is desirably shorter than $B_{M'}$ digits in terms of a bit stream.

Further, in the above configuration, estimated prediction modes are defined as one group G. However, a plurality of estimated prediction modes can be divided into two or more groups. In this case, for each one of the two or more groups, it is possible to decode a flag indicating that an actual prediction mode is identical to any one of the estimated prediction modes constituting one of the two or more groups. Further, in a case where an actual prediction mode is identical to any one of the estimated prediction modes constituting the one of the two or more groups as a result of determination of a flag, it is also possible to further decode an index that indicates an estimated prediction mode that is identical to the actual prediction mode which estimated prediction mode is from among the estimated prediction modes constituting the one group. The flag and index are the same as the flag_bitG and mpm_idx above.

As described above, in coded data that is to be inputted into the moving image decoding device 2a, first decoded is information on identicalness of a plurality of estimated prediction modes and an actual prediction mode. Only when the actual prediction mode is not identical with any of the plurality of estimated prediction modes, information for designating a prediction mode is further decoded. This makes it possible to reduce a total amount of codes for prediction modes. Note that the estimated prediction modes are preferably calculated from a prediction mode for an adjacent block. Further, the number of estimated prediction modes is preferably changed in accordance with the number of prediction modes to be used. For example, the number of prediction modes can be set to 2 in a case where a predetermined constant M is used and the number of prediction modes is not less than M; meanwhile, in a case where the number of prediction modes is less than M, the number of estimated prediction mode can be set to 1. As in this example, when the number of prediction modes is larger, the number of estimated prediction modes is preferably set larger. Alternatively, for example, in a case where a predetermined constant M is used and the number of prediction modes is not less than M, the number of estimated prediction modes is preferably set to 3; meanwhile, in a case where the number of prediction modes is less than M, the number of estimated prediction modes is preferably set to 2.

It is also preferable to alternatively employ a configuration where, for example, the number of estimated prediction modes are decided so that the number of remaining prediction modes is $2^n$. When the number of remaining prediction modes is $2^n$, coding can be performed at a substantially equal probability by using a fixed bit number. In this sense, for example, in a case where the number of prediction modes is 18, the number of estimated prediction modes is preferably set to 2. This is because the number of remaining prediction modes is 16 in this case. Further, for example, in a case where the number of prediction modes is 35, the number of estimated prediction modes is preferably set to 3. This is because the number of remaining prediction modes is 32 in this case.

As described above, by deriving a plurality of estimated prediction modes ordered according to a method that is employed in the moving image decoding device 1a, the moving image decoding device 2a can decode coded data that is generated by the moving image coding device 1a.

(Additional Matter 1)

The present embodiment has discussed a method of coding/decoding a flag which indicates that an actual prediction mode is identical with each of estimated prediction modes. Note however that the other methods can be used. For example, a method can be such that a flag indicating that an actual prediction mode is identical with any one of a plurality of estimated prediction modes is coded, and, in addition, in a case where the actual prediction mode is identical with the any one of the plurality of estimated prediction modes, identification data to be associated with the any one of the plurality of estimated prediction modes can be included in coded data. In this case, it is preferable that a length of a code of the identification data be shorter in bitstream than $B_M$ figure.

(Additional Matter 2)

According to the present embodiment, determination is carried out in each step with the use of a block size. Note however that the determination can be carried out without the use of the block size. An example is a case where a total number of prediction modes for each of subject blocks does not depend on its block size and is thus constant.

(Additional Matter 3)

The present invention is not limited to the description of the embodiments above, but may be altered by a skilled person within the scope of the claims. An embodiment based on a proper combination of technical means disclosed in different embodiments is encompassed in the technical scope of the present invention.

Lastly, each block of the aforementioned moving image decoding devices 1 and 1*a* and each block of the aforementioned moving image coding devices 2 and 2*a* may be realized by way of hardware as executed by a logic circuit provided on an integrated circuit (IC chip), or by way of software as executed by a CPU (Central Processing Unit).

In a case of realizing by way of software, each of the devices includes (i) a CPU which executes a command of a program that implements functions of the each of the moving image coding devices 1 and 1*a* and the each of the moving image decoding devices 2 and 2*a*, (ii) a ROM (Read Only Memory) in which the program is stored, (iii) a RAM (Random Access Memory) which derives the program, and (iv) a storage device (a recording medium) such as a memory in which the program and various sets of data are stored. The object of the present invention can be also attained as follows. That is, a recording medium in which program codes (an executable program, an intermediate code program, and a source program) of a control program of the each of the devices, which are software that implement the functions, are computer-readably recorded is supplied to the each of the devices, and a computer of the each of the devices (a CPU or an MPU) reads and carries out the program codes recorded in the storage medium.

Examples of the recording medium include (i) tapes such as a magnetic tape and a cassette tape, (ii) disks including magnetic disks such as a floppy (Registered Trademark) disk and a hard disk, and optical disks such as a CD-ROM, an MO, an MD, a DVD, a CD-R, and a Blu-ray Disc (Registered Trademark), (iii) cards such as an IC card (including a memory card) and an optical card, (iv) semiconductor memories realized by a mask ROM, EPROM, EEPROM, a flash ROM, and the like, and (v) logic circuits such as PLD (Programmable logic device) and FPGA (Field Programmable Gate Array).

Further, the each of the devices can be arranged to be connectable to a communication network so that the program codes can be supplied to the each of the devices via the communications network. The communication network is not limited in particular, provided that the communication network is capable of supplying the program codes to the each of the devices. Examples of the communication network includes the Internet, an intranet, an extranet, a LAN, ISDN, VAN, a CATV communications network, a virtual private network, a telephone network, a mobile telecommunications network, and a satellite communication network. A transmission medium of which a communication network is composed is not limited in particular, provided that the transmission medium is capable of transmitting the program codes. Examples of the transmission medium includes wired transmission media such as IEEE1394, a USB, a power-line carrier, a cable TV circuit, a telephone line, and ADSL (Asymmetric Digital Subscriber Line) and wireless transmission media such as infrared communication systems such as IrDA and a remote controller, Bluetooth (Registered Trademark), IEEE802.11 wireless communication system, HDR (High Data Rate), NFC (Near Filed Communication), DLNA (Digital Living Network Alliance), a mobile phone network, a satellite circuit, and a digital terrestrial network.

(Additional Matter 4)

The present invention can be described as below. An intra-prediction mode estimation device according to one aspect of the present invention is an intra-prediction mode estimation device for performing intra-prediction mode estimation of an image, in a coding process or a decoding process for a digital image constituted of a plurality of blocks, comprising: a selecting section for selecting one or more reference blocks for comparison with a subject block, which is a subject for the intra-prediction mode estimation; an estimating number deciding section for deciding a total number of estimated prediction modes to be estimated as estimated values in the intra-prediction mode estimation for the subject block; and an estimating section for performing the intra-prediction mode estimation for the total number of the estimated prediction modes with respect to the subject block, based on a prediction mode used for a coding process of the reference block thus selected.

A coding device according to another aspect of the present invention is a coding device for coding a digital image constituted by a plurality of blocks, comprising: a selecting section for selecting one or more reference blocks for a subject block, which is a subject for the coding; an estimating number deciding section for deciding a total number of estimated prediction modes to be estimated as estimated values in intra-prediction mode estimation for the subject block; an estimating section for performing the intra-prediction mode estimation for the total number of the estimated prediction modes with respect to the subject block, based on a prediction mode used for a coding process of the reference block thus selected; a prediction mode deciding section for deciding a prediction mode for the subject block; a prediction mode coding section for coding the estimated prediction modes and the prediction mode in such a way that a code length of the coding is different according to whether or not the prediction mode is identical with any one of the estimated prediction modes; and a predicted image generating section for generating a predicted image of the subject block, based on the prediction mode, the prediction mode coding section performing the coding in such a way that the code length of the coding is shorter when the prediction mode is identical with any one of the estimated prediction modes than when the prediction mode is not identical with any one of the estimated prediction modes.

A decoding device according to still another aspect of the present invention is a decoding device for decoding a coded data of a digital image constituted by a plurality of blocks, comprising: a selecting section for selecting one or more reference blocks for a subject block, which is a subject for the decoding; an estimating number deciding section for deciding a total number of estimated prediction modes to be estimated as estimated values in intra-prediction mode estimation for the subject block; an estimating section for performing the intra-prediction mode estimation for the total number of the estimated prediction modes with respect to the subject block, based on a prediction mode used for a coding process of the reference block thus selected; a prediction mode decoding section for decoding, from the coded data, a prediction mode to be used in generation of predicted image of the subject block, the prediction mode decoding section performing the decoding based on the total number of the estimated prediction modes and the estimated prediction modes; and a predicted image generating section for generating a predicted image of the subject block, based on the prediction mode.

Coded data according to yet another aspect of the present invention is coded data of an image, which coded data, constituted by a plurality of blocks, is outputted or is to be outputted from the above-mentioned coding device, the coded data comprising respective pieces of information regarding each of the plurality of blocks, the respective pieces of information being individually: a) information indicating that a first estimated prediction mode for the block is identical with a prediction mode for the block; b) information indicating that a second estimated prediction mode but not the first estimated prediction mode is identical with the prediction mode; or c) (i) information indicating that the first estimated prediction mode and the second estimated prediction mode are not identical with the prediction mode, and (ii) information regarding the prediction mode.

Coded data according to still yet another aspect of the present invention is coded data of an image, which coded data, constituted by a plurality of blocks, is outputted or is to be outputted from the above-mentioned coding device, the coded data comprising respective pieces of information regarding each of the plurality of blocks, the respective pieces of information being individually: a) (i) information indicating that an estimated prediction mode included in the group consisting of one or more estimated prediction modes for the block is identical with the prediction mode for the block, and (ii) information designating that estimated prediction mode; or b) (i) information indicating that no estimated prediction mode included in the group consisting of one or more estimated prediction modes for the block is identical with the prediction mode for the block, and (ii) information regarding the prediction mode.

According to the above configuration, it is possible to adaptively decide, for each of subject blocks, a total number of estimated prediction modes to be estimated. Generally, the use of a large number of estimated prediction modes increases a possibility that one of the large number of estimated prediction modes is identical with an actual prediction mode. However, in a case where none of the large number of estimated prediction modes is identical with the actual prediction mode, this causes an increase in an amount of coded data. Therefore, according to the above configuration, it is possible to yield an effect of efficiently coding/decoding prediction modes with a smaller amount of coded data than average by adaptively deciding a total number of estimated prediction modes to be estimated.

The intra-prediction mode estimation device according to the present invention is preferably configured such that the estimating number deciding section decides the total number of prediction modes according to a total number of the prediction modes used for a coding process of the subject block.

According to the above configuration, since a total number of estimated prediction modes to be estimated is controlled according to a total number of prediction modes used for a coding process of a subject block, it is possible to derive the number of the estimated prediction modes which number corresponds to the total number of the prediction modes, that is, a variety of choices of the prediction modes.

For example, in a case where a total number of prediction modes is high, it is unlikely that any of estimated prediction modes is identical with an actual prediction mode. Therefore, by increasing a total number of the estimated prediction modes to be estimated, it is possible to increase a possibility that any of the estimated prediction modes is identical with the actual prediction mode.

The intra-prediction mode estimation device according to the present invention is preferably configured such that the estimating number deciding section decides the total number of prediction modes such that a total number of prediction modes to be estimated for a first subject block is greater than that for a second subject block, if a total number of prediction modes for a coding process of the first subject block is greater than that of the second subject block.

According to the above configuration, the estimating number deciding section decides the total number of the estimated prediction modes in such a way that, for a subject block for which a total number of prediction modes is large, the total number of the estimated prediction modes to be estimated is large, and for a subject block for which a total number of prediction modes is small, the total number of the estimated prediction modes to be estimated is small. This makes it possible to prevent decrease in efficiency of coding which decrease is caused due to use of a small number of estimated prediction modes for a subject block for which a total number of prediction modes is large.

The intra-prediction mode estimation device according to the present invention is preferably configured such that the estimating number deciding section decides the total number of prediction modes according to a dimension of the subject block.

According to the above configuration, the estimating number deciding section decides, according to a dimension of a subject block, a total number of estimated prediction modes to be estimated. Therefore, in a case where a total number of prediction modes is to be decided according to a dimension of a subject block, a total number of estimated prediction modes to be estimated can be decided without reference to the total number of the prediction modes.

The intra-prediction mode estimation device according to the present invention is preferably configured such that the estimating number deciding section decides the total number of prediction modes according to dimensional relative relationship between the subjection block and the reference block.

According to the above configuration, it is possible to decide that a total number of estimated prediction modes to be estimated is a number corresponding to similarity of a subject block and a reference block. For example, difference in dimension between a subject block and a reference block indicates that an image in the subject block may be different in characteristics from an image in the reference block. Because any of estimated prediction modes which are derived with the use of the reference block having different characteristics is unlikely identical with an actual prediction mode, the use of a large value in a total number of the estimated prediction modes to be estimated makes it possible to increase a possibility that any of the estimated prediction modes is identical with the actual prediction mode. Alternatively, in a case where the subject block is too different from the reference block, the use of a low value in the total number of the estimated prediction modes to be estimated makes it possible to prevent increase in an amount of coded data.

The intra-prediction mode estimation device according to the present invention is preferably configured such that the estimating number deciding section determines the dimensional relative relationship according to areas or side lengths.

According to the above configuration, it is possible to easily decide dimensional relative relationship according to areas or side lengths of a subject block and a reference block. This makes it possible to prevent increase in an amount of calculation for evaluating the dimensional relative relationship.

The intra-prediction mode estimation device according to the present invention is preferably configured such that the estimating section further performs the prediction mode estimation based on positional relationship between the subject block and the reference block.

According to the above configuration, by performing prediction mode estimation based on positional relationship, it is possible to increase a possibility that any of estimated prediction modes is identical with an actual prediction mode. For example, it is determined that prediction modes are more accurate as estimated prediction modes because, since a prediction direction indicated by each of the prediction modes indicates a direction in which correlation between pixel values is strong, correlation between the prediction modes becomes high in a case where a direction indicating positional relationship between a subject block and a reference block is similar to the prediction direction for the reference block. This makes it possible to increase estimation accuracy of estimated prediction modes.

The intra-prediction mode estimation device according to the present invention is preferably configured such that the selecting section selects, as the reference block, a block for which a prediction mode had been decided before the subject block.

According to the above configuration, a reference block holds, as information, prediction modes which have been actually used, and thus it is possible to estimate estimated prediction modes with the use of the information.

The intra-prediction mode estimation device according to the present invention is preferably configured such that the selecting section selects, as the reference block, blocks adjacent to the subject block in a left upward direction, an upward direction, and a leftward direction.

According to the above configuration, it is possible to estimate estimated prediction modes with the use of adjacent reference blocks. For example, in a case where a process is performed on blocks in raster scan order, blocks adjacent to a subject block in an upward direction, a leftward direction, and a left upward direction have been processed, and thus prediction modes for the block have been decided. Therefore, the processed blocks are suitable for reference blocks. By performing estimation with the use of such adjacent blocks, it is possible to estimate estimated prediction modes while corresponding to local characteristics of an image.

(Additional Matter 5)

Each of the macro blocks of the embodiments corresponds to an LCU (Largest Coding Unit, the LCU is also referred to as a root of a Coding Tree) of HEVC (High Efficiency Video Coding) which is proposed as a successive standard of H.264/MPEG-4 AVC. Each of the macro blocks and each of the blocks corresponds to a CU (Coding Unit, the CU is also referred to as a leaf of the Coding Tree), a PU (Prediction Unit), and a TU (Transformation Unit) of HEVC. The LCU is also referred to as a tree block.

(Additional Matter)

The embodiments of the present invention have been specifically discussed with reference to the drawings. Note however that specific configurations are not limited to the embodiments, and design and the like which do not exceed the content of the present invention are also encompassed in the patent claims.

INDUSTRIAL APPLICABILITY

The present invention can be preferably employed for a moving image processing system including (i) a moving image coding device for coding a moving image and (ii) a moving image decoding device for decoding a coded image.

REFERENCE SIGNS LIST

1 Moving image coding device
1a Moving image coding device (intra-prediction mode estimation device, coding device)
2 Moving image decoding device
2a Moving image decoding device (intra-prediction mode estimation device, decoding device)
10 MB coding section
11 Prediction information deciding section
12 Prediction information coding section
13 Predicted image generating section
14 Prediction residual coding section
15 MB coded data multiplexing section
20 MB decoding section
21 MB coded data inverse multiplexing section
22 Prediction residual decoding section
23 Prediction information decoding section
121 Prediction mode recoding section
122 Estimated prediction mode deciding section
123 Prediction mode coding section
231 Prediction mode decoding section
1221 Estimated prediction mode deriving section
10a MC coding section
12a Prediction information coding section
20a MB decoding section
23a Prediction information decoding section
122a Estimated prediction mode deciding section
123a Prediction mode coding section
231a Prediction mode decoding section
1221a Estimated prediction mode deriving section (estimating section)
1222a Estimating number deciding section
1223a Reference block selecting section (selecting section)

The invention claimed is:

1. A decoding device for decoding a coded data of a digital image constituted by a plurality of blocks, comprising:
   a selecting circuit configured to select one or more adjacent blocks for a subject block, which is a subject for the decoding;
   a deriving circuit for deriving, on the basis of a prediction mode(s) of the one or more adjacent blocks, an estimated prediction mode(s) to be estimated as an estimated value in intra-prediction mode estimation;
   a prediction mode decoding circuit for decoding, from the coded data, a prediction mode to be used in generation of a predicted image of the subject block, the prediction mode decoding circuit performing the decoding based on the estimated prediction mode(s) derived by the deriving circuit; and
   a predicted image generating circuit for generating a predicted image of the subject block, based on the prediction mode,
   the coded data comprising respective pieces of information regarding each of the plurality of blocks, the respective pieces of information being individually:
   a) (i) information indicating that an estimated prediction mode included in the group consisting of one or more estimated prediction modes for the block is identical with the prediction mode for the block, and (ii) information designating that estimated prediction mode; or
   b) (i) information indicating that no estimated prediction mode included in the group consisting of one or more estimated prediction modes for the block is identical with the prediction mode for the block, and (ii) information regarding the prediction mode.

2. A coding device for coding a digital image constituted by a plurality of blocks, the coding device outputting coded data of an image, which coded data is constituted by the plurality of blocks, the coding device comprising:

a selecting circuit configured to select one or more adjacent blocks for a subject block, which is a subject for the coding;

a deriving circuit for deriving, on the basis of a prediction mode(s) of the one or more adjacent blocks, an estimated prediction mode(s) to be estimated as an estimated value in intra-prediction mode estimation;

a prediction mode deciding circuit for deciding a prediction mode for the subject block;

a prediction mode coding circuit for coding the estimated prediction mode(s) and the prediction mode in such a way that a code length of the coding is different according to whether or not the prediction mode is identical with any one of the estimated prediction mode(s); and a predicted image generating circuit for generating a predicted image of the subject block, based on the prediction mode, the prediction mode coding circuit performing the coding in such a way that the code length of the coding is shorter when the prediction mode is identical with any one of the estimated prediction mode(s) than when the prediction mode is not identical with any one of the estimated prediction mode(s), the coded data comprising respective pieces of information regarding each of the plurality of blocks, the respective pieces of information being individually:

a) (i) information indicating that an estimated prediction mode included in the group consisting of one or more estimated prediction modes for the block is identical with the prediction mode for the block, and (ii) information designating that estimated prediction mode; or b) (i) information indicating that no estimated prediction mode included in the group consisting of one or more estimated prediction modes for the block is identical with the prediction mode for the block, and (ii) information regarding the prediction mode.

* * * * *